United States Patent
Behrendt et al.

(10) Patent No.: US 8,560,889 B2
(45) Date of Patent: *Oct. 15, 2013

(54) ADDING SCALABILITY AND FAULT TOLERANCE TO GENERIC FINITE STATE MACHINE FRAMEWORKS FOR USE IN AUTOMATED INCIDENT MANAGEMENT OF CLOUD COMPUTING INFRASTRUCTURES

(75) Inventors: Michael M. Behrendt, Randersacker (DE); Rafah A. Hosn, New York, NY (US); Ruchi Mahindru, Elmsford, NY (US); Harigovind V. Ramasamy, Ossining, NY (US); Soumitra Sarkar, Cary, NC (US); Mahesh Viswanathan, Yorktown Heights, NY (US); Norbert G. Vogl, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,879

(22) Filed: Sep. 5, 2012

(65) Prior Publication Data
US 2012/0331342 A1 Dec. 27, 2012

Related U.S. Application Data

(63) Continuation of application No. 12/964,340, filed on Dec. 9, 2010.

(51) Int. Cl.
*G06F 11/00* (2006.01)
(52) U.S. Cl.
USPC .............................. 714/15; 714/26
(58) Field of Classification Search
None
See application file for complete search history.

(56) References Cited

U.S. PATENT DOCUMENTS 7,219,260 B1 * 5/2007 de Forest et al. ................ 714/15
7,600,146 B2 10/2009 Liccione et al.

OTHER PUBLICATIONS

Burke et al., Fault Tolerant State Machines, California Institute of Technology, 2004, pp. 1-10.
Kulkarni et al., Adding Fault Tolerance to State Machine-Based Designs, WSPC, Jan. 22, 2007, pp. 1-29.
Schneider, Implementing Fault-Tolerant Services Using the State Machine Approach: A Tutorial, ACM Computing Surveys, Dec. 1990, vol. 22, No. 4, pp. 299-319.
Elnozahy et al., A Survey of Rollback-Recovery Protocols in Message-Passing Systems, ACM Computing Surveys, Sep. 2002, pp. 375-408, vol. 34, No. 3.
Mao et al., Mencius: Building Efficient Replicated State Machines forWANs, USENIX Association, 8th USENIX Symposium on Operating Systems Design and Implementation, pp. 369-384, Dec. 8-10, 2008 San Diego, CA, USA.

* cited by examiner

*Primary Examiner* — Scott Baderman
*Assistant Examiner* — Jason Bryan
(74) *Attorney, Agent, or Firm* — Scully, Scott, Murphy & Presser, P.C.; Louis J. Percello, Esq.

(57) ABSTRACT

A scalable and fault tolerant finite state machine engine, for example, for use in an automated incident management system, logs or records data in persistent storage at different points or levels during various internal processing of an event associated with an information technology element, and action taken associated with the event, by executing a finite state machine instance that encodes policies for handling incidents on such types of information technology elements. In the event that the finite state machine engine is shutdown during processing, the finite state machine engine is able to pick up from where it left off when it was shutdown, for each abnormally terminated finite state machine instance, by using the data logged in the persistent storage and determining a point of processing from where it should continue its execution.

15 Claims, 9 Drawing Sheets

ADDING SCALABILITY AND FAULT TOLERANCE TO GENERIC FINITE STATE MACHINE FRAMEWORKS FOR USE IN AUTOMATED INCIDENT MANAGEMENT OF CLOUD COMPUTING INFRASTRUCTURES

CROSS REFERENCE TO RELATED APPLICATION

This application is a continuation of U.S. patent application Ser. No. 12/964,340, filed Dec. 9, 2010 the entire content and disclosure of which is incorporated herein by reference.

FIELD

The present application generally relates to computer systems and more particularly to adding scalability and fault tolerance to generic finite state machine frameworks, for example, for use in automated incident management of a cloud computing infrastructure.

BACKGROUND

A Cloud Computing model offers inexpensive on-demand computing facilities, providing incentives to end users to move away from managing their own information technology (IT) infrastructures. Such a model offers infrastructure and software services on demand to end users, in which the users need not maintain their own facilities to perform an IT task. Instead, end users use the computing facilities and software supplied by a provider (also referred to as a service provider), generally requiring the end users to only have a computer with minimum processing power that can connect to the Internet or a network and provide a "screen" through which commands can be submitted to the provider's computing facilities. Providers of Cloud Computing services typically use large infrastructures to leverage economies of scale, and virtualization on top of physical hardware (servers) to improve resource utilization. Managing such large infrastructures is extremely labor intensive, which does not bode well for introducing a paradigm shift in the industry where Cloud Computing services should be offered at competitive prices to induce end users to adopt the new model. The answer to that may be automation —of data center, middleware and application management processes. One area that is very labor-intensive is incident management in large data centers, and Cloud Computing service providers have addressed that problem with automation—monitoring IT infrastructure elements for evidence of faults (or for predicting impending ones) and taking simple corrective actions by leveraging some type of decision support system (e.g., a rule or policy engine or a finite state machine engine) which is used to represent knowledge of how to handle faults (incidents) and to exercise that knowledge in real time to provide automated incident management.

This disclosure describes a framework, based on the formalism of Finite State Machines (FSMs) that is used in the field of Computer Science, that can be used to build an Automated Incident Management System (AIMS) for large Cloud Computing environments, using the basic approach of representing policies for managing an IT element in an FSM definition or type, and tracking a deployed IT element using an instance of that FSM. Building upon off-the-shelf FSM engines available commercially or as open source software, it describes how to provide the properties of scalability, persistence, and fault tolerance to an FSM-based AIMS. Automation should be robust and provide certain guarantees about being able to survive faults in its own execution environment.

The framework described here provides fault tolerance properties to an FSM engine for a fail stop fault model. Furthermore, scalability is provided for handling large Cloud Computing infrastructures where there may be many IT (hardware, middleware, application) elements being tracked by FSM instances, and persistence is provided for proper modeling and tracing of IT infrastructure elements whose operational life cycle can span months or years.

BRIEF SUMMARY

In one aspect, a system for executing finite state machines in a scalable and fault tolerant manner may be provided. The system for executing finite state machines in a scalable and fault tolerant manner, in one aspect, may include one or more processors and a persistent storage for storing data associated with handling of an event associated with an information technology element. A finite state machine engine may be operable to receive the event and execute a finite state machine instance representing the information technology element, and may be further operable to log in the persistent storage, a plurality of internal actions associated with processing of the event, wherein if the finite state machine engine is stopped while in execution, the finite state machine engine continues to process the event based on the persistent data logged in persistent storage indexed by the finite state machine instance to complete the handling of the event, after the finite state machine engine is restarted.

A method for implementing scalable, fault-tolerant finite state machines, in one aspect, may include receiving an event associated with an information technology element and identifying an entry associated with the information technology element in a finite state machine states table stored in persistent storage. The method may also include updating the entry as locked in the finite state machine states table and storing the updated finite state machine states table in the persistent storage. The method may further include creating a finite state machine instance to process the event and initializing it with information from the finite state machine states table. The method may also include invoking an execute operation of the finite state machine instance, wherein the finite state machine instance executes state transitions associated with the information technology element, starting from the point where it finished execution when it was last invoked. The method may further include logging data in the persistent storage indicating that a workflow is to be scheduled before submitting the workflow, and logging data in the persistent storage indicating that the workflow is submitted after scheduling the workflow. The method may yet further include, after the finite state machine instance finishes, updating the entry as unlocked, and also storing current state information to be used in the next execution, in the finite state machine states table.

A method for executing finite state machines in a scalable and fault-tolerant manner, in another aspect, may include an event queue polling thread polling an event queue in persistent storage, and in response to receiving an event in the event queue, the event queue polling thread associating the event with a finite state machine instance representing an information technology infrastructure element based on information stored in a finite state machine states table. The method may also include the event queue polling thread inserting a work item including an identifier associated with the information technology element, the type of element, the current state of the finite state machine and the event identifier and event name, in an in-memory thread pool queue. The method may further include the thread pool further allocating a thread to run the finite state machine. The method may yet further include the thread creating a finite state machine instance associated with the information technology element, initializing it with values set in the work item, and executing the finite state machine instance until the finite state machine quiesces. The method may also include the finite state machine instance retrieving data from an event-action history table to determine one or more corrective actions to be taken associated with the event. The method may further include the finite state machine instance logging the one or more corrective actions to be taken and a workflow unique identifier associated with the one or more corrective actions to be taken in a workflow unique identifier table. The method may also include the finite state machine instance scheduling the one or more corrective actions with a workflow system module for executing corrective actions, the finite state machine performing a validation protocol with each scheduled workflow before permitting it to continue execution when scheduled, wherein in response to a processor executing the steps of the method being shutdown and restarted, the finite state machine can continue to process the event from a point of processing before the shutdown based on logs stored in the persistent storage during the steps.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
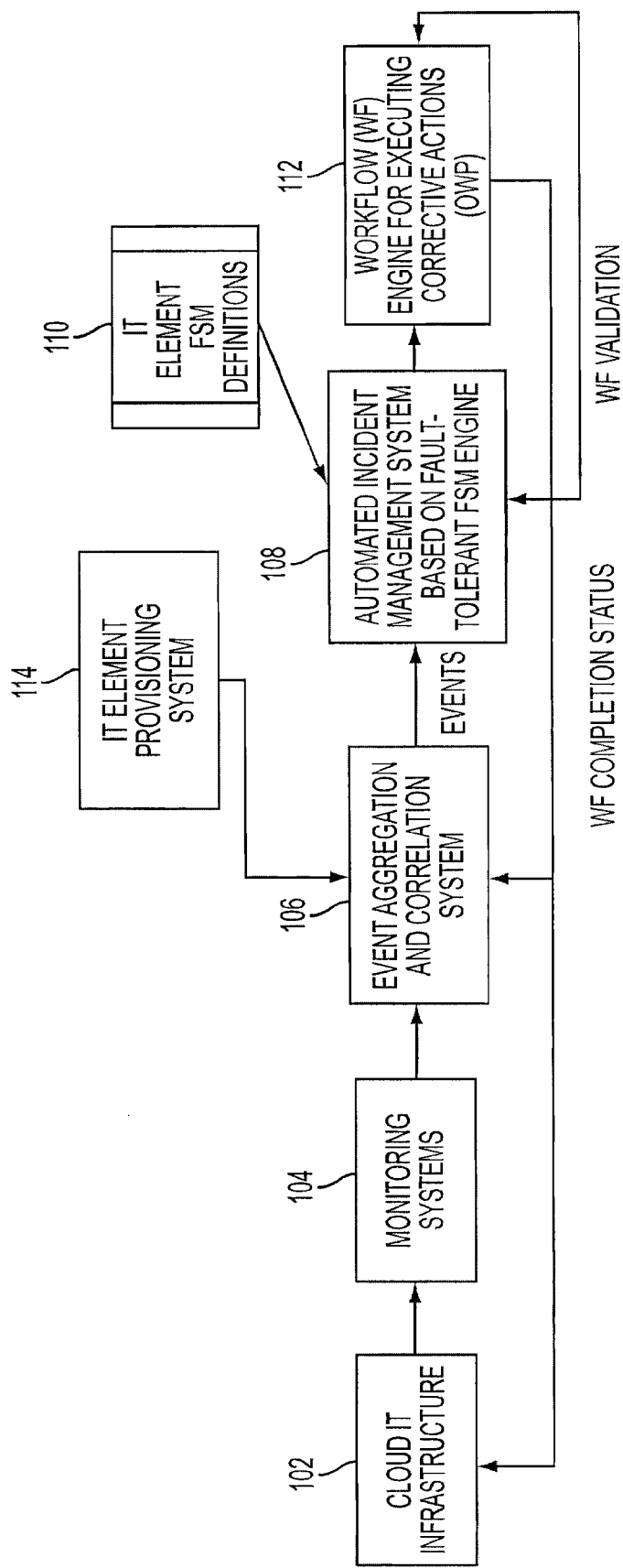
FIG. 1 illustrates high level components and intra-component data flows in an automated incident (fault) management system for a Cloud Computing infrastructure that uses an FSM engine and IT element-specific FSM definitions to model incident management policies.

An Automated Incident Management System (AIMS) can be modeled as a set of Finite State Machines (FSM). Each FSM represents a type of IT element in the Cloud Computing infrastructure—such as a server hosting virtual machines, a network element such as a router or switch, a storage element such as an NFS server providing shared storage to a set of servers—and also middleware or software elements running in physical or virtual machines such as a Web application server, a database management system, and others. An FSM for an IT element type models the different states that the element can be in, from "birth" (when the element is first brought into the Cloud data center and is ready to be put into service) to "death" (when the element is declared to be so faulty as to be unusable). For each state, an FSM can be used to represent how it should respond to an external event (in the case of AIMS, the event representing a potential fault or status notification for instance)—by transitioning to a next state, and performing some action before or after the transition. In the AIMS context, such an action, to react to an incident reported on a server for example, might involve restarting a failed process on the server, rebooting the server, reimaging the server, etc. Besides the event and current state, the transition of the FSM and the action to take can also depend on the history of past events received and actions taken. Use of an FSM to model how to handle events (incidents) reported on an IT element adds an extra dimension to the knowledge representation formalism compared to that provided by a flat set of rules—that of state. Depending on the operational state of the IT element type, the same event might be treated differently. For example, if a server has recently been patched, then it may go through a test phase (be in TEST state) before being declared fully healthy and operational, and if a fault is detected during the test phase, then the corrective action required might be more severe than if the fault is detected when the server is in a healthy/operational state.

An instance of an FSM represents a specific IT element deployed in the Cloud infrastructure. If there are 5000 servers hosting virtual machines in a service provider's data center, then the AIMS system based on the FSM modeling formalism would instantiate 5000 instances of the Server FSM that models how incidents on any server should be handled automatically. Similarly, there would be multiple instances of a Network-element FSM, a Storage-element FSM, a Web-Application-Server FSM, etc., one for each corresponding IT element in the infrastructure on which incidents are to be automatically handled.

An FSM-based AIMS implementation in one embodiment of the present disclosure is based on an FSM execution engine that is scalable, persistent (long-running) and fault tolerant. Scalability is required so that AIMS can execute thousands of FSM instances as events on any IT element can arrive at any time and can be responded to in a timely fashion. In one embodiment of the present disclosure, the FSM engine supports the execution of FSMs that can last (from "birth" to "death" state) for months or years, which is the expected life time of most enterprise quality IT infrastructure elements, though software/middleware elements deployed on virtual machines on demand might have shorter lifetimes. In one embodiment of the present disclosure, the FSM-based AIMS is fault tolerant. The fault tolerance guarantee provided by AIMS is based on a fail-stop fault model: if AIMS is made aware of an incident (fault) or any other event it should handle and acknowledges its receipt, then it will handle the event as modeled in the appropriate FSM even if the system crashes due to the failure of the software execution environment (e.g., a Java Virtual Machine), the operating system, or the hardware of the computer it is running in, as long as the failure is eventually corrected and the system restarted. One exception that the fail stop fault model does not cover is a system crash due to a software defect (bug) in the framework itself.

This framework can also be used to build other fault-tolerant decision support systems which can be modeled using FSMs—AIMS is simply one example domain. That is, the fault tolerant FSM engine can be used to implement any (automated) decision support system where FSMs are suitable, not just an incident management system.

A typical off-the-shelf FSM engine, e.g., the open source State Chart XML (SCXML) system, operates in-memory. Running thousands of FSM instances using SCXML will not scale due to the huge memory requirements. The FSM engine will also lose all state information about FSM instances if the system is shut down even for planned maintenance. Such systems are also not tolerant of faults (unplanned outages).

The present disclosure in one aspect describes a general technique for adding scalability, persistence and fault tolerance to an off-the-shelf finite state machine (FSM) engine. A method in one embodiment may convert a general purpose, in-memory, non-persistent, FSM runtime engine (e.g., SCXML)) into a scalable, persistent, fault-tolerant FSM engine, more suitable for use in automated management systems for Cloud Computing. In one embodiment of the present disclosure, persistent storage (files or relational database tables) is used to implement scalability and persistence, and a logging and replay mechanism using persistent storage is utilized to provide fault-tolerance on top of an in-memory FSM engine.

The method, in one aspect, builds a scalable FSM engine that can execute many FSMs (e.g., thousands) concurrently inside a single automated incident management system (AIMS) instance for extended periods of time, and which can survive planned shutdown of AIMS. The method, in another aspect, makes the FSM engine fault-tolerant. For instance, once an event is received by the AIMS component, it will be handled by the AIMS even in the event of an operating system (OS), JAVA™ virtual machine (JVM) or hardware-driven server fault/crash. The fault model is fail-stop.

Still yet in another aspect, the method may use logging and log-replay techniques to build a fault-tolerant architecture using a single instance of the FSM engine, without any use of replication. However, the method may use (active-passive) replication to improve the availability model of the solution. The method in one embodiment relies on logging of various internal actions in the processing of each event, and replaying the log after a crash to honor the event handling fault tolerance guarantee. The method of the present disclosure may also be used in an active-active FSM replication solution, e.g., using Paxos-like algorithms. Paxos-like algorithms provide protocols for allowing multiple systems operating as a cluster to distribute shared state across all members of the cluster in a consistent manner, in the presence of failure of any cluster member or of any portion of the communications network used in the cluster. Specifically, the framework for providing fault tolerance using logging identifies the minimum state information that has to be shared across a multi-FSM-engine cluster implementation using active-active replication, to provide the same fault tolerance guarantees without explicit logging.

The framework presented in the present disclosure in one embodiment assumes, without loss of generality, that any FSM modeling an IT element takes actions that affect the external world (e.g., to reboot a Server with a critical fault) by running workflows. A workflow engine that provides the ability to run workflows asynchronously, after accepting a workflow execution request and queueing the request, is assumed to be available. The workflow engine exists outside the FSM engine framework and is itself not expected to be fault-tolerant. However, in the context of the FSM engine framework and specifically the fault-tolerance property, it should be ensured that once an FSM instance submits a workflow and subsequently the engine crashes before execution of that instance can complete (quiesce) properly, then during the log-replay phase (described later), the workflow is not blindly resubmitted, since a workflow may have a side effect that is not idempotent. A workflow is nonidempotent if reexecuting it during log replay has an adverse side effect, e.g., such as a workflow that reboots a server would have because it would cause an additional reboot operation if blindly repeated. The framework addresses this problem without imposing any additional requirements on the external workflow execution engine.

Note that in practical systems, sometimes no corrective action may be feasible (e.g., if a Server experiences a hard disk failure and becomes inoperable) and the only feasible action for AIMS is to create a ticket using a problem reporting system that system administrators monitor. Without any loss of generality, this disclosure assumes that such tickets can also be submitted using workflows, and in the rest of the disclosure, when a reference to the term "corrective action" is made, it may also include actions that are not strictly "corrective" such as creating, updating and closing tickets automatically.

The scalability, persistence and fault tolerance properties of the FSM engine, in the base case without any replication, are implemented using persistent storage, which can be either in the form of files or relational database tables.

In one embodiment, the FSM engine provided by this framework builds upon an off-the-shelf FSM engine which is assumed to have the following properties. It provides a language for representing the states and state transition rules that define a given FSM (type); e.g., XML, as is the case with the SCXML system. It allows an external control mechanism to create a unique instance of any FSM type, "prime" it with a given start state and input event, and then execute the FSM instance from that state until it reaches a state where execution cannot proceed any further until another event is received, at which point it returns control back to the caller. The caller can then query the FSM instance for its current state. It is also assumed that the FSM definition can include other "global variables" such as a system identifier (ID) that uniquely identifies the IT element it represents, and that such variables can also be "primed" in the FSM instance before execution. The FSM definition formalism allows externally defined functions to be invoked, to evaluate additional conditions that govern state transitions (e.g., to query the history of past events received and actions performed on that IT element by the FSM instance), and to also perform other functions such as scheduling workflows that have side effects on the outside world, e.g., the Cloud Computing infrastructure. The SCXML FSM engine for example has all these properties.

In one embodiment, the scalability and persistence (long-running) properties of the FSM engine are enabled by using persistent storage, and running each FSM instance in an incremental mode without requiring it to reside in computer memory (or paging store) throughout its life cycle—from start state to end state. When an event is received indicating an incident on a given IT element, the corresponding FSM instance data is retrieved from a table (the FSMSTATES table in FIG. 3) and is used to create an in-memory instance of the appropriate FSM type and prime it with the system ID and state (CurrState) information as well as the event just received. The FSM is then executed with the primed information until it reaches a state where it cannot proceed further until another event is received, at which time control returns to the higher level engine. Ignoring faults (covered later), the FSM's current state is queried, and it is saved back in the FSM States table for repeating the above processing when the next event is received on that IT element. The in-memory FSM instance is then destroyed. Using this execution model, only those FSM instances that are currently processing events need to be in memory, and if no FSM instance is currently executing, then the higher level FSM engine (that forms the core of AIMS) can even be shut down and restarted later. This is the technique used in one embodiment of the present disclosure for providing the scalability and persistence properties.

Timers can be started by any FSM instance in order to take an action if some other expected event is not received after a given period of time that is domain-specific. This feature is supported in FSM definition languages such as SCXML. Timers are typically set using in-memory mechanisms (e.g., the Java library has a timer abstraction). Expiration of a timer thus set is assumed to also generate an event, an internal one that is processed by the FSM and drives a state transition as encoded in the FSM definition. However, any timer set by an FSM instance is also persisted, in one embodiment in the Timers table in FIG. 3. This allows for a case in which if the high level FSM engine is shut down when no FSM instances are executing, which will result in all in-memory timers being destroyed, then upon system restart, the timers can be restarted appropriately by inspecting the Timers table. If a timer has actually expired while the FSM engine was shut down, then upon restart, the event reporting that timer's expiry will be generated. This is also an integral component of the persistence architecture of the present disclosure in one embodiment.

In this embodiment, an instance of an FSM of the appropriate type (e.g., a Server FSM) is first created when a corresponding IT element (in this case a server), with a unique system ID (e.g., an IP address), is reported as being deployed for the first time in the data center via an event that reports its "birth" (not every event represents a fault). A new entry (tuple) in the FSM States table representing this IT element is created. The current state of the FSM instance is set to the initial state of the FSM definition, and then execution proceeds as in the steady state case described above.

In one embodiment, the fault tolerance property of the FSM engine framework is implemented by logging in persistent storage various actions involved in receiving and processing an event (incident) to completion, specifically—creating an FSM instance to process the event, inserting it into the queue of a thread pool to schedule its execution when an appropriate (thread) resource becomes available, initiating the incremental execution of the FSM instance after priming it with the current state, system ID and event information when the thread becomes available, continuing execution until the FSM instance is about to queue a workflow to perform an action on an external system, recording the intent to submit the workflow, executing the FSM action of scheduling the workflow by submitting a request to an external workflow engine, recording the successful submission of the workflow request, and returning control to the external engine which extracts the current state of the FSM instance and logs it in the FSM States table.

The system and method of the present disclosure can work with thread pools, threads, processes, process pools, jobs, and tasks. Accordingly, the use terminology "thread" in this disclosure is not limited to referring to a thread per se. Rather, the term "thread" is used interchangeably to mean a thread, a process, a job, a task or other computer execution entity or the like, or even combinations thereof, if applicable.

The details of the logging steps are described later in the context of FIG. 4A and FIG. 4B. If any fault occurs during the execution of the higher level FSM engine (e.g., a JVM failure, OS failure, server hardware failure, or a failure of the system where the logs are maintained), then once the system is restarted, it examines the various log entries recorded during individual FSM instance executions and based on the logic described in FIG. 5, replays selected actions to reschedule or complete any FSM instance execution steps that were interrupted due to the fault. Without loss of generality, a specific coding pattern is assumed to facilitate the implementation of the fault tolerance property on top of an in-memory FSM engine. The pattern in one embodiment may include the following—in a given FSM definition, any action involving the scheduling of a workflow is performed in a unique state. This is so that in case a fault occurs during the (critical) workflow scheduling steps, replay of the FSM instance can be continued starting from that step rather than from the beginning. Enforcing the coding pattern of isolating the workflow execution step to a unique state does not reduce the power of the FSMs (i.e., the complexity of business logic) that can be defined.

FIG. 1 illustrates a process flow and system components for automated handling of incidents in an IT infrastructure, for example, a cloud IT infrastructure, in one embodiment of the present disclosure. Cloud IT infrastructure 102 may include plurality of computing components including physical resources and software resources, for instance, processors with memory devices, storage devices, network devices such as switches and routers, servers running applications and software and others. These are also referred to as IT infrastructure elements. Note that this is just an example domain, and the FSM-based system can also be used to automate incident management of virtual machines, middleware components and software applications running on those virtual machines, or for that matter, components running in a non-Cloud environment also.

Monitoring Systems 104 monitor the system components of the Cloud IT infrastructure 102 to determine whether any of the components are experiencing failure or functioning abnormally, for instance, their loads have exceeded their thresholds, one or more components are not responding, and other behaviors. Such monitoring systems employ sensors that collect critical pieces of information from IT elements that are used to eventually generate events that indicate faults to the AIMS system.

An Event Filtering, Aggregation and Correlation System 106 processes raw data reported by the monitoring systems and converts it into an optimal number of events which are sent to AIMS based on fault-tolerant FSM engine 200 of the present disclosure for handling the incident. The event filtering capability of System 106 is used determine whether the information received from the monitoring systems 104 indicates abnormal behavior. For example, a monitoring system may simply report the operating system (OS) level average CPU utilization of each server (hosting virtual machines (VMs)) every 30 seconds—the sampling interval. The event filtering component can evaluate a rule (representing domain knowledge) that checks if the CPU utilization for a given monitored server is above 90% for 10 sampling intervals in a row (5 minutes), and if true, concludes that there is a critical performance problem on that server and sends AIMS based on fault tolerant FSM engine 108 an event indicating that condition. The Event aggregation and correlation capabilities of 106 are also used to recognize that multiple events raised on the same system correspond to the same root cause (e.g., multiple server-based agents becoming unreachable concurrently possibly indicates a server outage), and instead of sending multiple events to AIMS based on fault-tolerant FSM engine 108, it sends a single event.

The fault-tolerant FSM-based Automated Incident Management System 108 (AIMS) in one embodiment of the present disclosure is built by modeling each type of IT element (e.g., Cloud infrastructure element, IT element, or other elements of computer systems and networks) as a Finite State Machine (FSM). The fault-tolerant FSM-based AIMS 108 of the present disclosure may employ a finite state machine engine to execute multiple instances of different FSM types 110 to track the state of different IT elements in the data center. The fault-tolerant FSM-based AIMS 108 is able to automate the handling of incidents occurring in the IT infrastructure by executing the FSM instance corresponding to the IT element with a fault indication, thereby exercising the domain knowledge encoded in the FSM definition of state transitions and actions to perform to handle the specific event automatically. Each FSM definition (type) in 110 models the life cycle of a given type of IT element from birth to death in terms of the states it transitions through in response to problems that are reported, and corrective actions that are taken during state transitions.

All systems external to the fault-tolerant FSM-based AIMS 108 interact with it by sending it events. Each event is processed by a specific FSM instance which represents the IT element that is the subject of the event. The FSM model defines for each state, given an input event and the history of events received for that IT element and actions taken on it in the past, what the next state transition should be and what actions (if any) should be taken. For example, if a Server FSM instance is in HEALTHY state, and an event indicates that the virtual network interface used by a virtual machine on a server is down, and there is no record of such an event occurring on that server in the last 30 minutes (a duration defined by a policy), then the state transition definition might dictate that the FSM should schedule a workflow to run a command on the server to bring the interface back up, and transition to the NORA (nonobtrusive recovery action) state to wait for workflow execution status. However, given the same state and event, if there is a record (in the Event Action History table of FIG. 3) that the same or another virtual interface on the same server has gone down twice already in the last 30 minutes even after running the workflow to bring it up, and therefore this is the third failure in a row in a relatively short time period (as judged by a domain expert), then the state transition definition might dictate that the FSM should schedule a workflow to run a command to reboot the server—a more obtrusive action that is warranted due to the apparent ineffectiveness of the simpler corrective action in the past.

AIMS based on fault-tolerant FSM engine 108 performs corrective actions on IT elements by submitting workflows (WFs) to a work flow (WF) engine 112. A WF engine 112 may be an external module or system that actually performs the corrective action which the fault-tolerant FSM-based AIMS 108 schedules. Execution of each WF is asynchronous, and WF completion status is also reported to the fault-tolerant FSM-based AIMS 108 using the event mechanism. The WF completion status event may cause a further state change in the FSM instance. For example, in the first case above when the virtual interface was reported to be down, a WF to bring the interface up is scheduled and the FSM instance for that server transitions to NORA state. When the WF executes successfully, it sends an event indicating that it completed successfully. When the event is processed, the FSM instance transitions from NORA back to HEALTHY state. Due to the possible delay in the execution of a WF—since the workflow execution system is external to AIMS over which it has no control, a workflow validation protocol is run by each workflow as soon as it is scheduled for execution, to check with the fault-tolerant FSM-based AIMS 108 whether its execution is still required to take the corrective action it is coded for. If other events received on that system indicate that an earlier scheduled corrective action is no longer required, then the fault-tolerant FSM-based AIMS 108 will indicate to the WF that it should not execute and the WF will terminate immediately. Conversely, if the fault-tolerant FSM-based AIMS 108 validates the WF, then it will perform its intended function and send a completion status event to the fault-tolerant FSM-based AIMS 108. Note that this workflow validation protocol feature is utilized during logging and replay (details presented later) to guarantee that in the event of a fault in the fault-tolerant FSM engine, when it performs an FSM replay during recovery and the actions replayed involve a workflow being scheduled, the same workflow is not run multiple times. In terms of a classic distributed system, to the fault tolerant FSM engine-based AIMS, the external workflow engine is an "other world process" over which it has no control regarding its behavior (correctness, delays, fault model). The operation of AIMS itself, driven by multiple FSM instances with well defined state transition rules, is deterministic, the only source of nondeterminism being external events sent to it, the type, number and frequency of such events being factors over which AIMS has no control.

Besides events from the Monitoring Systems indicating incidents and from workflows indicating execution status, the fault-tolerant FSM-based AIMS 108 can also receive events from an IT Element Provisioning System 114 (which may or may not be fully automated). The job of the Provisioning System is to prepare an IT element for deployment in the Cloud. It is also a source of events sent to the fault-tolerant FSM-based AIMS 108, and in this case, an event indicates the "birth" of that element, which in turn triggers the creation of an instance of the corresponding FSM type (definition) that will be used to track that IT element's life cycle.

Figure 2:
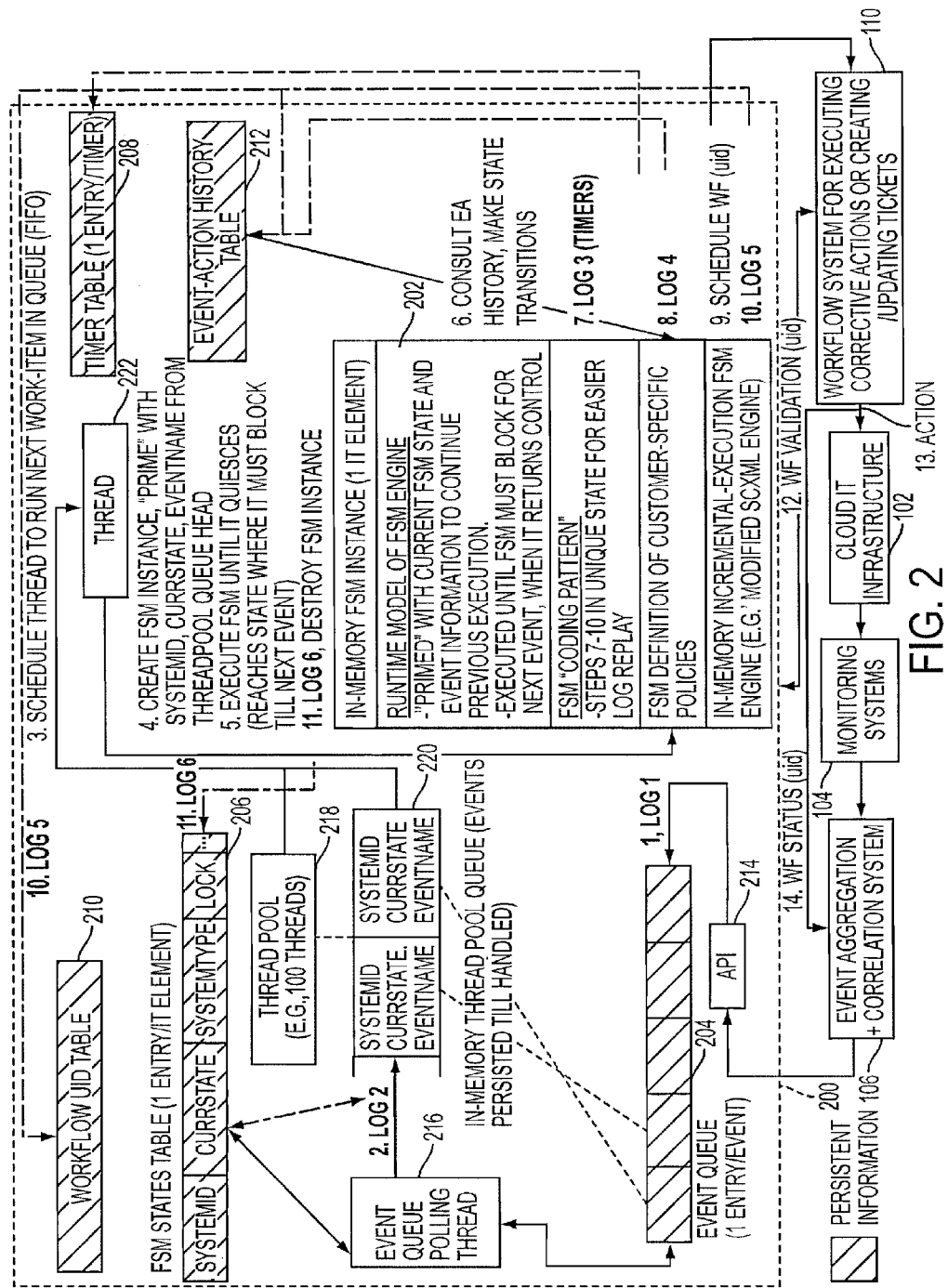
FIG. 2 illustrates a scalable and fault-tolerant finite state machine engine in one embodiment of the present disclosure.

FIG. 2 illustrates one embodiment of the present disclosure where a scalable and fault-tolerant finite state machine (FSM) engine-based event processing system 200 is used, for example, to implement the Automated Incident Management System (AIMS) 108. An embodiment of the high level flow is described in this figure. Detailed steps are described in FIGS. 4A and 4B. In the present disclosure, the fault-tolerant FSM engine is shown as box 200, and described in conjunction with its use in an AIMS. It should be understood, however, that the fault-tolerant FSM of the present disclosure may be utilized not only with AIMS but in other applications and systems.

The FSM Engine 200 (e.g., as part of the functionality of AIMS 108 in FIG. 1) executes instances of different types of FSMs, each modeling how to track the state of, and manage incidents reported on, a given type of IT element. An example of an IT element is a server. Other types of IT elements are contemplated and can also be modeled as FSMs. Elements shown at 204, 206, 208, 210 and 212 represent data stored in persistent memory to log (record) actions taken during FSM execution, in order to facilitate recovery from crashes by replaying such logs. As described with reference to FIG. 1, Monitoring Systems 104 monitor elements of an IT environment 102 and notify an Event Aggregation and Correlation System 106 of possible failures (faults) in the components of the IT environment 102. Events are also generated by workflows executing in a workflow system 110, and by a provisioning system such as 114.

An application programming interface (API) 214 or the like receives an event from the Event Aggregation and Correlation system 106 and queues the event in an event queue 204. The event queue 204 stores one entry per event, and may be a first-in-first-out (FIFO) queue. The event queue 204 is implemented using persistent storage, that is, the data stored in the event queue 204 is preserved even in the case of a system failure or in the case the system shuts down and boots up again. The logging of an event in the event queue 204 (step 1) is also referred to as log 1 in the present disclosure in one embodiment. An example of an event is an entry that indicates that a Server with IP address 9.1.2.3 in the Cloud infrastructure has a critical performance problem.

An event queue polling thread 216 periodically polls or monitors the event queue 204 and if the event queue 204 is populated with at least one entry (event), it retrieves the highest priority event from queue 204 that is eligible for processing using a set of event prioritization policies. The event queue polling thread 216 next retrieves from the FSM States table the information required to continue execution of the FSM instance associated with the IT element for which this event has been reported—namely the identity of the IT element (its SystemId), the SystemType used to identify the FSM type to instantiate, and its current state to continue execution from—which is the representation inside AIMS of the last known state of the IT element. In one embodiment of the present disclosure, the FSM States table 206 has an entry per IT element. An entry in the FSM States table 206 logs information about each FSM instance, which can be used to continue its execution whenever a new event is received from the IT element that it models. As explained above, an FSM entry for a given IP element (uniquely identified by its SystemId) may be first created when the IT element is first deployed for use in the Cloud infrastructure using an IT Element Provisioning System 114. Such a provisioning action is expected to generate a (non-fault) event, which may be reported to the fault-tolerant FSM 200 (e.g., via AIMS 108) as is any other event, via the Event Aggregation and Correlation System 106.

The queue polling thread 216 uses information from an event being processed and the FSM States entry queried to create a work item and to enqueue it to queue 220 of thread pool 218 to schedule its execution whenever a thread in the pool becomes free. Thread pools are common facilities provided by programming runtime systems (e.g., the JVM). The polling thread also updates the FSM States (persistent) table to record the fact that a work item corresponding to this FSM instance has been scheduled by setting the Lock field to 1, and records the event to be handled by the FSM instance, identified by the EventId field whose value is unique for each event enqueued to queue 204. This logging action (step 2) is referred to as log 2 in the present disclosure. Now the work item is ready to execute whenever a thread in the thread pool is deemed to be free by the thread pool management system 218.

Eventually a free thread 222 is scheduled (step 3), which runs the next unit-of-work (interchangeably referred to as a work item or a work object) in queue 220. Thread 222 uses the information stored in the work item (the SystemType) to create an in-memory instance of the correct type of FSM, sets its internal variables—current state, system ID, and the event to be processed (step 4), and then uses the facilities of the off-the-shelf FSM engine 202 to start the execution of the FSM instance with the inputs provided (step 5) to control what action should be taken by AIMS in response to the event reported. For example, if the current state of the FSM instance representing a server is HEALTHY, and the event being processed indicates that a virtual interface on that server is down, then the execution of the FSM instance for the Server FSM type using engine 202 will ensure that the FSM action modeled—namely to schedule a workflow to restart the interface and transition to the NORA (nonobtrusive recovery action) state to wait for the WF status event—is performed correctly. The FSM engine 202 will execute the FSM instance, using Thread 222, until the FSM instance reaches a state where no further execution is possible until another event is received. At that point, the FSM engine returns control to Thread 222.

During its execution, the processing logic embedded in the FSM instance may consult an event-action history table 212 as part of its decision making process regarding how to handle the event (step 6). The event-action history table 212 contains information about past events received and actions taken on different IT elements, each identified by its unique SystemId. For example, if the event-action history table reveals that the given virtual interface on this Server has already been down twice before and has been restarted in the past 30 minutes, then the third occurrence may result not in yet another repetition of the prior corrective action, but a reboot of the Server instead—a more obtrusive action—based on the encoding of an automated incident management policy for servers as defined by a domain expert who created the FSM definition. The event-action history table may have one entry per action taken. After an action is taken, the FSM instance 202 may record or log the action in the event-action history table 212.

Besides its use in controlling the execution of an FSM instance, the event-action history table is also used to store log entries related to FSM execution that are used for implementing fault tolerance. As described earlier, each FSM type is assumed to adhere to the programming pattern that any workflow scheduling action is isolated to a unique FSM state. Before a workflow is actually scheduled using an external workflow engine 112, a unique workflow ID is generated to identify that workflow, and the intent to schedule the workflow is logged in the event-action history table, this entry being referred to as log 4 (step 8) in the present disclosure in one embodiment.

After the workflow is scheduled successfully (step 9), that fact is also recorded in the event-action history table, this entry being referred to as log 5 (step 10) in the present disclosure in one embodiment. Details of the log entries created are described in FIGS. 4A and 4B. Note that in this embodiment, if the workflow scheduling call fails, the FSM engine does not provide a generic failure handling logic. It is the responsibility of the domain expert to encode the recovery actions in the FSM definition itself. For example, an FSM can be modeled to respond to a workflow scheduling error by making it transition to a "workflow engine failure" state, where it remains until the workflow engine is healthy again, something that can be checked in that state by periodically "pinging" it (leveraging timers and timer events, described below) using a suitable API provided by the workflow engine provider. Once the workflow engine is found to be responsive again, the FSM instance can transition back to the original state and resubmit the workflow.

The starting of timers is also a component of defining an FSM. For example, if a Server FSM instance transitions from HEALTHY to NORA state after receiving an event indicating that a virtual interface is down, and schedules a workflow to restart the interface, it might choose to remain in that state for a maximum of 20 minutes awaiting the workflow status event (a domain expert-defined policy embedded in the FSM definition). If no workflow status event is received and the timer expires—i.e., the corresponding timer event is received, then the FSM may transition to a different state and take a different action (such as rescheduling the workflow, or creating a ticket) according to its type definition. An off-the-shelf FSM engine may allow such timers to be scheduled using in-memory services typically provided by operating systems or program execution environments (e.g., a JVM). However, for fault tolerance in one embodiment of the present disclosure, timers that are scheduled are also logged in persistent storage, to facilitate those timers being restarted if the FSM engine experiences an outage (planned or unplanned) and is later restarted. Logging of such timers being scheduled during FSM execution, in persistent storage, is referred to as log 3 (step 7) in one embodiment of the present disclosure, and can occur at any point during an FSM's execution.

Execution of the FSM instance by FSM engine 202 completes when the FSM instance cannot proceed any further without another event being received. Then control is returned to Thread 222 at the point where it started the execution of the FSM instance. At that point, the current state of the FSM (from which its execution should continue the next time it is restarted) is recorded in the FSM States table, and the Lock field is set back to 0 to indicate that the handling of the event with EventId is complete (step 11). At that time, log 4 and log 5 entries in the Event-Action history table may be cleared since they are not required (for crash recovery of this execution) any more. Execution of the FSM instance by in-memory FSM engine 202 is now complete and the FSM instance (in-memory object) may be destroyed. Thus, in one embodiment, the FSM instance that scheduled a remediating action associated with the event it was handling may not be running when the workflow or work item is executed (action taken), because the work is being done asynchronously by within a workflow engine. Creation of an FSM instance when required and its destruction when incremental execution completes addresses the scalability requirement of being able to execute many FSM instances, with long (execution) lifetimes, in parallel without a huge memory footprint.

Processing continues outside of the FSM engine execution. In step 12, the workflow engine schedules the execution of the next workflow when resources to do so become available. Before execution of its main logic, each workflow is encoded to communicate with the AIMS system using a validation protocol where it passes its workflow ID back to AIMS to enable it to check whether its execution is still required. For example, if the AIMS system has crashed and been restarted and it is unsure about whether a given workflow has been successfully scheduled or not, then during log-replay, it will reschedule the same workflow again with a different workflow ID and invalidate the previous workflow ID. If the previous workflow had also been successfully queued just before AIMS crashed, then during the validation protocol, that workflow will be directed to abandon execution. This guarantees that workflows are not executed multiple times due to log replay.

In step 13, the workflow execution completes and it may result in some (corrective) action being taken on the IT element in response to the event received and logged in step 1. In step 14, the status of the workflow execution (which might also indicate a failure to perform the corrective action—step 13 thereby being unsuccessful) is passed back to the AIMS system as an event, one that is not generated by the monitoring system.

In the above steps, as the FSM engine proceeds through the various processing stages shown in FIG. 2 for a given FSM instance handling a given event identified by a unique EventId value, the various log entries created in the log tables during the execution represent the different "log levels" for that instance executing steps 2 through 11. If execution of the FSM instance fails due to any type of system failure identified by the fail-stop fault model, then the highest level of log entry recorded for each incomplete FSM execution (identified in the FSM States table by any entry where the Lock field is set to 1 during log 2) can be used, in accordance with the log replay logic described in FIG. 5, to complete or reschedule each incomplete execution when AIMS or the like is restarted.

Figure 4A:
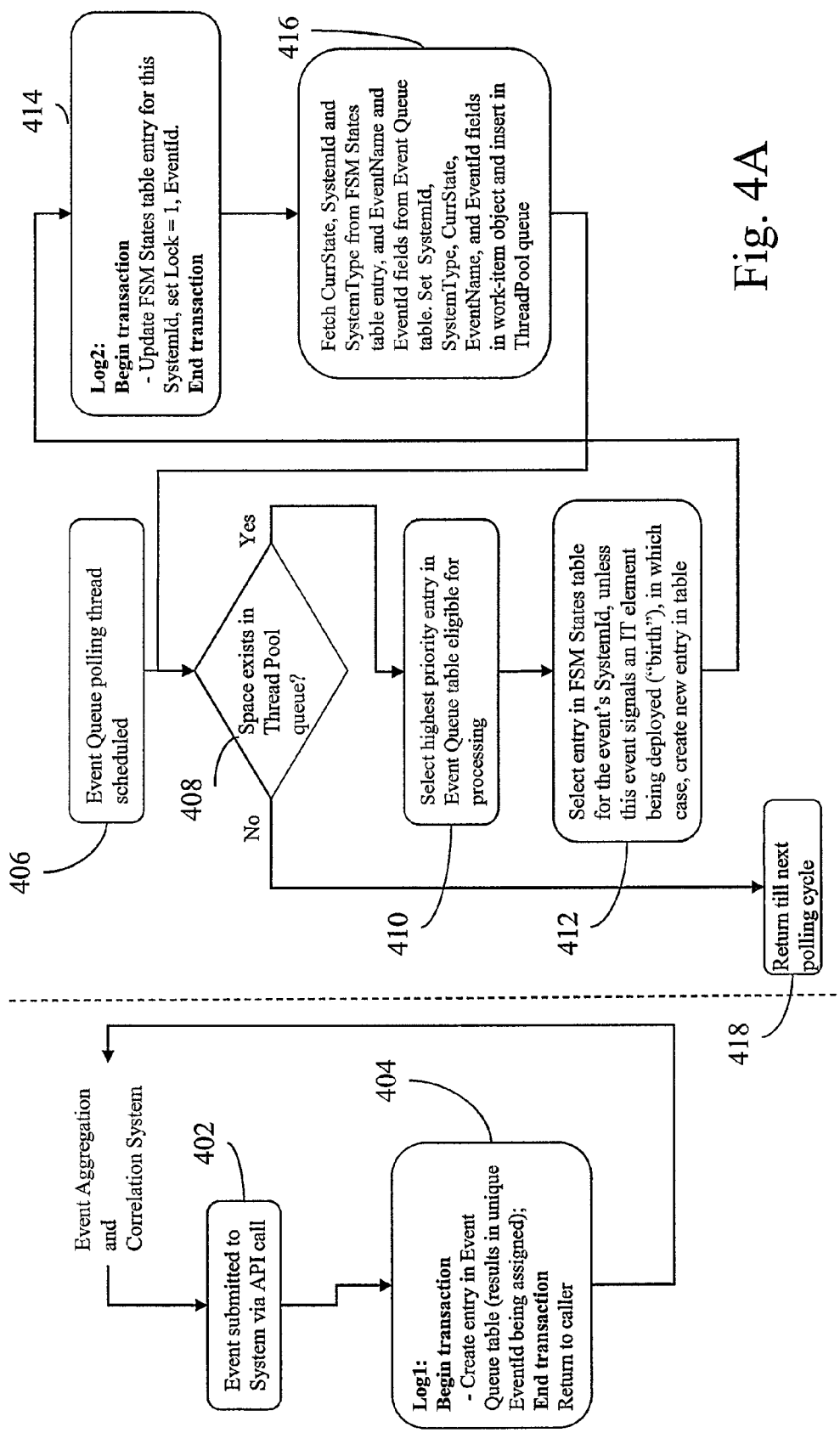
FIGS. 4A and 4B are flow diagrams illustrating the event processing logic utilizing the components shown in FIG. 2 in one embodiment of the present disclosure.
Figure 4B:
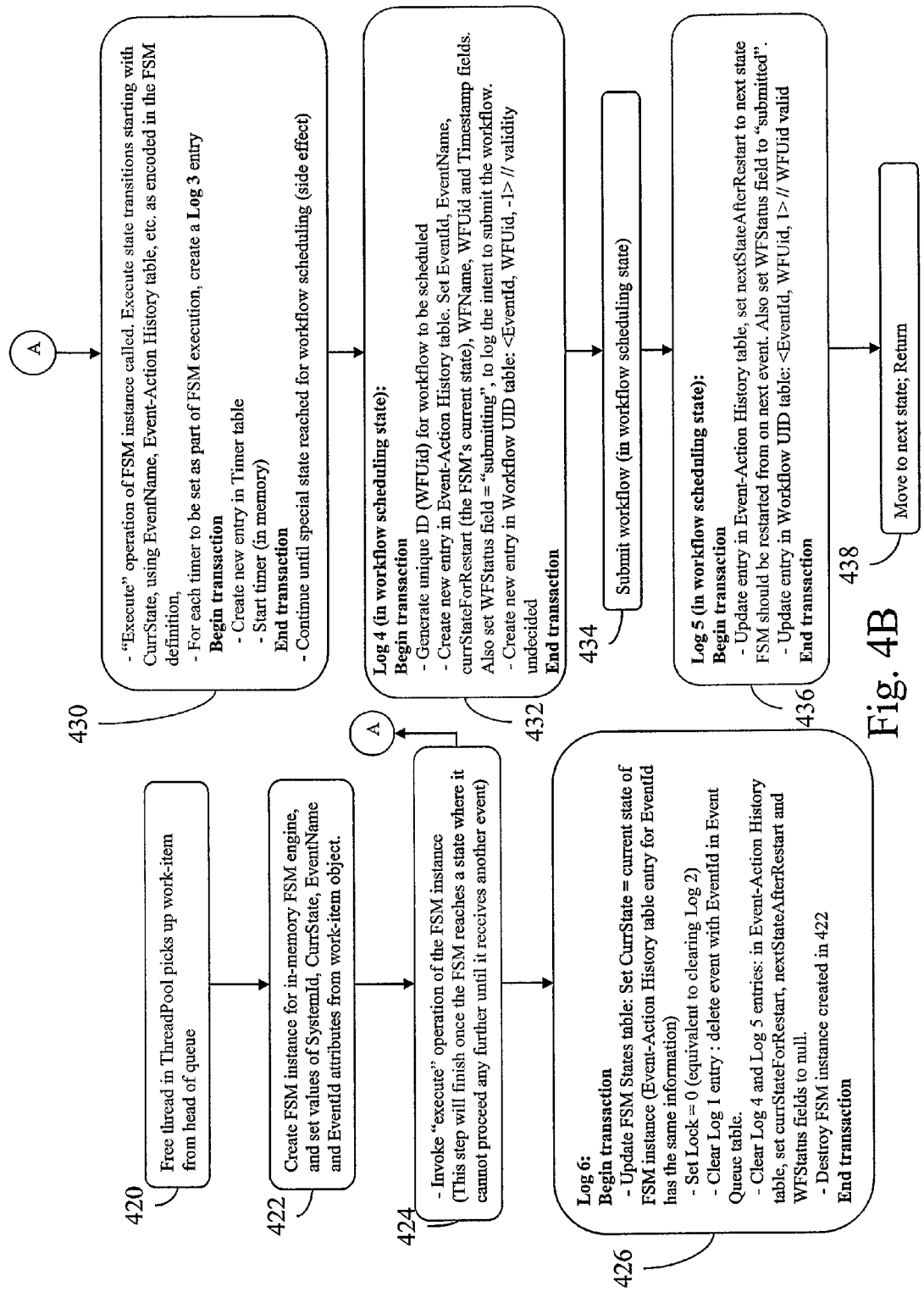

For instance, after log 4 (step 8) only certain fields in the event-action history table are set for a given EventId value, whereas after log 5 (step 10) more fields of the table are set—as described in FIG. 4B. For each EventId representing an incomplete FSM instance execution after a restart, examination of the various log tables can be used to determine the highest successful log level during that execution, which can be used to determine the correct point from which to continue execution. In this context, the point from which execution of an FSM instance is to be continued is determined by its current state setting, as well as the setting of other variables used to prime the FSM instance such as the system ID, system type, event name and event ID, before it is executed using an in-memory FSM engine.

Figure 3:
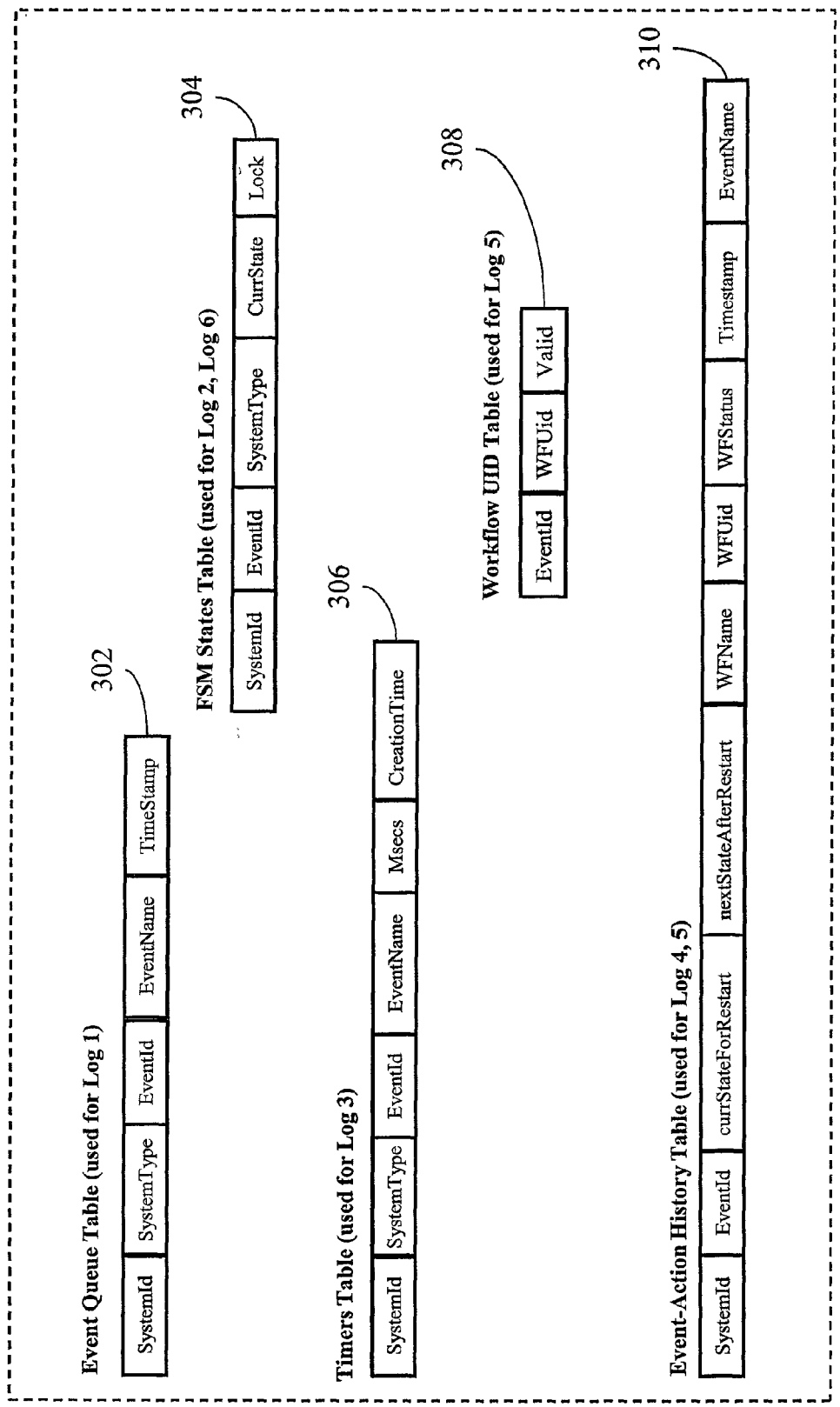
FIG. 3 shows persistent data stores used to implement fault tolerance in the present disclosure in one embodiment.

FIG. 3 shows the persistent data stores used to store the various pieces of log information (levels 1 through 6) during the execution of each FSM instance, to enable log replay in the event of an abnormal shutdown (crash) of AIMS which is built on top of the fault-tolerant FSM engine. Note that even though in one embodiment, relational database tables are used to store log information, in another embodiment, files provided by any file system on any standard operating system (OS) can be used instead. Similarly, transactions that ensure atomicity (all-or-nothing semantics) across multiple log update operations, used in the logging and replay logic, and provided as a feature in relational database systems, can also be implemented on top of a standard file system in an alternate embodiment using well known techniques.

The Event Queue (used for log 1) 302 stores information associated with events queued to the AIMS system. The events are received into the AIMS in the present disclosure in one embodiment from an external module that either identifies possible problems (faults) with a system, or reports on a new IT element being provisioned in the infrastructure, or reports the status of running a workflow. Events may be inserted into the event queue due to internal events also—specifically when a timer scheduled during the execution of an FSM instance expires. The Event Queue 302 may include an event identifier field (EventID) which is a unique identifier (ID) for each entry in the Event Queue 302. The Event Queue 302 may also include a system identifier field (SystemId), which is a unique ID associated with an IT element on which the event is reported, and a SystemType field which identifies the type of IT element (e.g., server, network element, etc.). The Event Queue 302 may further include an event name (EventName), which is the name of the event which uniquely identifies one of the following—a type of "fault" being reported, an instance of SystemType being provisioned, the execution status being reported for a workflow, or a specific timer having expired. The Event Queue 302 may also include a time indicator (TimeStamp), which is the time the event was queued into the Event Queue 302. Other types of events (or information) may also be received and stored.

An FSM States Table 304 is used for log 2 and log 6 entries. The FSM States Table 304 has one entry per IT element representing the FSM instance that is used to track its state and take automated actions on, and may include the following fields that are used to start or restart the FSM instance when an event is received on that IT element. A system identifier field (SystemId) represents a unique ID of the IT element whose state this FSM instance tracks. A current state field (CurrState) represents the last known state of the FSM when it stopped executing. When an FSM instance is restarted, it is primed with this state value. When an FSM instance is first created in response to an event sent by the provisioning system, this state is set to the start state of the corresponding FSM definition (every FSM definition includes a unique start state). A lock field (Lock) indicates whether this FSM instance is currently scheduled for (or in the midst of) execution. The Lock field is set to 1 when the FSM is scheduled for execution due to a new event and it is set to 0 only when the FSM has finished execution cleanly. If upon restart of AIMS, this field is 1 for an entry in the FSM States table, then it implies that the corresponding FSM instance did not terminate cleanly and must be recovered using the log-replay algorithm of FIG. 5. An event identifier field (EventId) identifies the unique ID of the last event processed (or the current event being processed if Lock is 1) by this FSM instance. This field may be used to reschedule an FSM execution for this event during log replay.

A Timers Table 306 is used for log 3 entries. The Timer Table 305 may include the following fields. A system identifier field (SystemId) stores the unique ID of the IT element for whose FSM instance a timer has been scheduled. The SystemType field stores the system type, and is used when queueing the timer event in the Event Queue to enable the right type of FSM instance to be created in step 4 of FIG. 2. An EventId field identifies which event was being processed by the FSM instance when it scheduled the timer—which is used to clear log 3 entries if necessary during log replay (see 514 in FIG. 5). An event name field (EventName) stores the name of the event to be inserted into the Event Queue for the FSM instance to process once the timer expires. A duration field stores the timer duration in milliseconds (Msecs), which is the amount of time after which the timer will expire and the event in the EventName field will be inserted in the event queue. The CreationTime field stores the timestamp of when this timer was created. This table logs in persistent storage the in-memory timers that are created by the in-memory FSM engine when executing an FSM instance. If the AIMS system is shutdown or crashes abnormally during normal operations, then without persistent timers, all in-memory information about timers that will expire at some point in the future will be lost due to the volatile nature of random-access memory in computers. Log 3 entries help preserve timer information across restarts, both normal and abnormal. Once AIMS is (re)started, and it reexecutes FSM instances that had not completed execution normally in the prior incarnation, the replay logic also goes through the Timers table and either restarts in-memory timers (for a shorter duration than before) for those entries where the timer would not have expired even if AIMS had not stopped execution, or inserts the specified events identified by the EventName field into the event queue for those timers that would have expired by the time the Timers table is examined.

A Workflow UID Table 308 is used for log 5, and contains one entry for each workflow that is scheduled during the execution of an FSM instance. The Workflow UID Table 308 may include the following fields. An event identifier field (EventId) stores the unique identifier (ID) of the event for which an FSM instance was scheduled and which in turn scheduled a workflow to take a corrective action. A workflow unique identifier field (WFUid) stores a unique ID generated for each workflow that is scheduled to take a corrective action. A Valid field, whose values can be 0, 1 or −1, for example, designates whether the workflow is valid, invalid, or whether its validity is yet to be determined, respectively. In the last case, the component of AIMS that performs the validation check for the workflow (responding to step 12 of FIG. 2 during a workflow execution) will wait until the value is set to 0 or 1.

An Event-Action History Table 310 is used for logs 4 and 5, and may also contain a few fields whose purpose is to enrich the FSM execution semantics (by allowing history to be a factor in the decision making process of the FSM's state transitions) and are not required for logging alone. Each entry in this table represents an action taken by an FSM instance due to an event received on the IT element it represents. The Event-Action History Table 310 may include the following fields. An event identifier field (EventId) stores the unique ID of the event for which a corrective action was taken by running a workflow. A current state for restart field (currStateForRestart) stores information about the current state of the FSM in which the workflow is being scheduled, and represents the start state that should be used for restarting the FSM after an abnormal failure if the FSM instance is to be restarted to only repeat the workflow execution and not all the state transitions that precede it. As noted before, to facilitate log replay when the FSM engine fails, before, during or immediately after an FSM instance schedules a workflow, a "modeling pattern" of isolating each workflow scheduling step to a separate state in the FSM definition is used in one embodiment of the present disclosure. This field is created for log 4. A next state after restart field (nextStateAfterRestart) stores the next state the FSM will "quiesce" to after workflow submission. This field is set when creating the log 5 entry. A workflow name field (WFName) stores the name of the workflow submitted. A workflow unique identifier field (WFUid) stores an ID which uniquely identifies this workflow submission. A workflow status field (WFStatus) is used to store information about the status of the workflow submission. Valid values for this field may be "submitting" and "submitted". (Other values or notations may be used for indicating the status.) The former value is set in log level 4 to express the intent to submit the workflow and the latter value is set in log level 5 to indicate that the workflow has been submitted. In one embodiment of the present disclosure, this field is used to determine, during log replay, if the highest log level is 4 or 5. A time stamp field (Timestamp) stores the information about when the entry was last updated. An event name field (EventName) stores the name of the event that was being handled by the FSM instance. The last two fields in this table may be optionally used for richer FSM modeling for implementing fault tolerance. Once an FSM instance finishes incremental execution successfully, this table entry records a point in time in the event-action history for that IT element, and it might impact future decisions taken regarding how to respond to an event on that element.

FIGS. 4A and 4B are flow diagrams illustrating the detailed event processing logic utilizing the components shown in FIG. 2 as well as the persistent log stores described in FIG. 3, in one embodiment of the present disclosure. At 402, an event is submitted to a system of the present disclosure, for example, to a fault-tolerant FSM engine. In one aspect, an event aggregation and correlation system or module or the like may submit such an event, for example, that signals a fault or problem in any IT element, using an application programming interface (API) call of the present disclosure in one embodiment. Other components that may submit events to the system are—an IT Element Provisioning System, a workflow reporting its execution status, or a timer that has expired, but not limited to only those. That is, other events and/or information from other components may be also received. At 404, an entry is created in an Event Queue table, which results in a unique event identifier being assigned. As discussed above, the Event Queue table is stored in persistent memory. Once the entry is created in the Event Queue table, the change is committed to the database using a transactional operation (indicated by the "Begin transaction" and "End transaction" markers surrounding the table update steps) which guarantees "all or nothing" semantics, namely that the table updates are stored permanently in persistent storage once the transaction completes (is committed), but none of the changes will appear in persistent storage if the transaction fails (is aborted) for any reason, including JVM, OS or hardware failure, the same fail-stop fault model factors that the FSM engine is being protected against. The implementation of the API that was called to submit the event may create and commit the event queue table entry. As described above, the implementation of persistent storage need not be limited to only databases. This storing of the event entry is referred to in the present disclosure as log 1. The function that implements the event submission API then returns to the caller. More events may be received and processed as shown in 402 and 404.

At 406, an Event Queue polling thread is scheduled. The Event Queue polling thread may be first scheduled, for example, when the FSM engine is started, and may be periodically rescheduled throughout the operation of the FSM engine. Each time the polling thread is scheduled, it queries the Event Queue table and identifies the highest priority eligible events that are to be handled. At 408, the Event Queue Polling thread determines whether there is free space in the thread pool's work item queue. If not, the Event Queue polling thread waits until the next polling cycle before querying the event queue any further. If free space exists in the thread pool's queue, the Event Queue Polling thread selects the highest priority entry in the Event Queue table for processing at 410—using any suitable event prioritization policy, the exact choice of which is not important for this disclosure. At 412, the Event Queue Polling thread uses the SystemID information in the event queue entry to query the FSM States table, to identify the FSM instance that is being used to track the IT element on which this event was reported. An exception to this step may occur when the event is submitted by the IT Element Provisioning system 114 in FIG. 1, in which case, an entry representing a new instance of the FSM type representing the IT element type is created in the FSM States table, and the SystemId, SystemType, and CurrState fields are initialized. The latter field is set based on the definition of the start state specified in the FSM definition.

At 414, the FSM States table entry is updated for this event. That is, for the entry in the FSM States table having a SystemId field value that is equal to value of the SystemId field in the event entry in the Event Queue table being processed, the Lock field is set to 1. The EventId field in the FSM States table entry is also set to the EventId field in the event entry. The updates to the FSM States table entry in persistent storage is then committed as a transaction. This set of updates to the FSM States table is referred to as log 2.

At 416, the current values of the FSM States table entry and Event Queue table entry just processed are used to create a work item for the in-memory thread pool queue. The CurrState field from the FSM States table entry, and the SystemId, EventId and EventName fields from the Event Queue table entry, are used to set the corresponding fields of a work item object that is inserted in the queue of the thread pool. A work-item object is data, for instance, in a data structure or object format, which is stored in an in-memory thread pool queue and includes information about a job or a task that a thread has to process. In the context of this disclosure, the task to be performed is to execute the FSM instance corresponding to the IT element referenced in this work item (identified by the SystemId field) to determine what automated action to take in response to the event received.

Referring to FIG. 4B, at 420, a free thread (a thread that is available to process a task, also referred to as a worker thread herein to differentiate it from the Event Queue Polling Thread) in a thread pool picks up a work-item from the thread pool queue. In one aspect, the thread pool queue may be a first-in-first-out queue, in which case a work-item from the head of the thread pool queue is selected for processing.

At 422, the worker thread creates an FSM instance. This is an operation that is expected to be supported by the off-the-shelf, in-memory FSM Engine 202 of FIG. 2. The values to prime the FSM instance are set from the values of the system identifier (SystemId), the current state (CurrState), event name (EventName), and event identifier (EventId) fields of the selected work item object.

At 424, the worker thread invokes an "execute" operation of the FSM instance, which is also a feature that the off-the-shelf FSM Engine 202 is expected to provide. This step will finish once the FSM reaches a state where it cannot proceed any further until it receives another event. Once the FSM finishes its execution, control is returned to the worker thread that invoked the "execute" operation.

At 426, assuming that the "execute" operation completes successfully, the worker thread updates the FSM States table to record the results of the execution in persistent storage and to mark the completion of the event handling step. For instance, the current state field (CurrState) of the FSM instance is set to the state of the FSM instance when it finished executing at 424. Note that this information may be fetched from the Event-Action History table entry's nextStateAfterRestart field keyed on the EventId value, or by querying the FSM instance object itself. The Lock field of the FSM States table is set to 0, which is equivalent to clearing the log 2 entry. Log entries from log1 are cleared, i.e., the entry in the Event Queue table representing the event, identified by the EventId just processed by this FSM instance, is deleted from the table. Furthermore, log 4 and log 5 entries are cleared, i.e., in the Event-Action History table, the values of the fields currStateForRestart, nextStateAfterRestart and WFStatus are set to null. The FSM instance created in step 422 for in-memory execution is deleted. This provides for scalable FSM execution in one embodiment of the present disclosure, ensuring that every FSM instance corresponding to an IT element instance is not kept in memory. The log table processing steps taken at 426 is referred to as log level 6. All updates to the persistent log tables made in log level 6 are performed within one database transaction.

Steps 430, 432, 434, 436 and 438 describe the details of the "execute" operation that is invoked in 424 to execute the logic of the FSM instance with the new input data. At 430, processing of the "execute" operation begins, and the off-the-shelf FSM Engine 202 executes the state transitions of the FSM instance starting from the current state (CurrState), using the event name (EventName), EventId and SystemId values set in 422, and querying the Event-Action History table as necessary for this SystemId. During the execution, if any timer has to be created as part of the FSM logic, then a separate service API provided by the fault-tolerant FSM engine is expected to be invoked to log the timer creation operation. This is the log 3 operation, during which a new Timers table entry is created, and the fields SystemId, EventId, EventName, Msecs and CreationTime fields are set, where the first two fields are set in the FSM instance in step 422, the EventName (what event to queue in the event queue when the timer expires) and Msecs (what is the duration of the timer) represent domain knowledge encoded in the FSM definition, and the CreationTime field is set to the timestamp reflecting when the timer entry was created. After the table entry is created successfully, an in-memory timer service (e.g., one provided by the JVM) is invoked to start the timer. Both operations are performed as part of a single database transaction.

The FSM engine continues execution of the FSM instance until the state is reached where, optionally, a workflow has to be scheduled. Note that the FSM engine itself is not aware of this state being special in any way, but to facilitate the log-replay logic that provides fault tolerance in one embodiment of the present disclosure, the following "coding pattern" is used in the definition of the FSM—namely that the state in which a workflow is scheduled be the last step in the execution of the FSM for an event, and that scheduling of the workflow should be the only step in that state. This state (which may be different from the CurrState setting when the "execute" operation was called) is recorded in the log 4 and 5 entries described below, and if replay has to be continued not from the start of the FSM but only for rescheduling the workflow, then that is made the new start state during replay and not the CurrState value in the FSM States table. It is assumed that for the scheduling of the workflow itself in the FSM definition, a service API provided by the fault-tolerant FSM engine is used, and in one embodiment of the present disclosure, it is in the implementation of that API that the log 4 and log 5 operations are encoded. Steps 432, 434 and 436 describe the operations performed by this API to schedule the workflow, including the logging steps.

In step 432, first a unique ID (WFUid) is generated to help uniquely identify the workflow being scheduled—for both validation and replay purposes. In one embodiment, such an ID can be generated using the SEQUENCE operation provided by commercial relational database management systems. In another embodiment, a random number generator in conjunction with the built in timer facility available in modern computer architectures (exposed through operating system (OS) system calls) can be used. Next, a new entry is created in the Event-Action History table 310, where the fields EventId, EventName, currStateForRestart, WFName, WFUid, WFStatus and Timestamp are set. The first two fields are those set in 422, currStateForRestart is the current state of the FSM in which the workflow is being scheduled, WFName identifies the workflow to be scheduled, WFUid is set to the identifier which uniquely identifies the workflow. The WFStatus field is set to "submitting" to record the intent to schedule the workflow, and the Timestamp fields represents the current time on the system. Once this is successful, a new entry is created in the Workflow UID table 308 where the unique WFUid identifying the workflow is recorded. The Valid field is set to −1 to indicate that the workflow's validity is not determined yet. All these operations, if successful, are committed as a result of the database "end transaction" step. This completes the log level 4 entry.

At 434, the workflow is submitted. For instance, the workflow may be submitted to an external workflow execution engine using an API provided by that component. In one embodiment, the workflow engine queues the workflow request and schedules it for execution when suitable resources become available, and therefore, the workflow execution model is asynchronous. The fault tolerant FSM engine has no control over the operation of the external workflow engine regarding when the workflow will be scheduled, or whether the workflow submission operation is fault-tolerant or not regarding whether it can survive a crash of the workflow engine and be restarted. The fault-tolerant FSM engine ensures that a workflow is not executed twice as a result of log-replay, since the execution of a workflow can have a disruptive effect such causing the reboot of a server. Note that workflows may be as simple as scripts that perform some action on an IT element, and the workflow execution system is not expected to provide transactional, all-or-nothing, commit-rollback type of semantics since providing such semantics in an open-ended workflow execution environment would involve defining compensating transactions for arbitrary operations on IT elements, which in general is a difficult task. The log-replay mechanism of the fault-tolerant FSM engine in this disclosure does not make workflows transactional; it only prevents duplicate workflows being executed due to log replay.

Continuing with the operation of the workflow submission API at 436, if the workflow submission succeeds, the Event-Action History table entry is updated again to reflect that fact as part of creating log 5. Note that the successful execution of an FSM instance is not complete until the log 6 entry is committed in step 426, and the purpose of log 5 is to allow replay of the FSM instance from the correct state if the execution ends abnormally before log 6. In this step, the field nextStateAfterRestart is set to the next state the FSM will transition to and quiesce waiting for the next event. The WFStatus field is set to "submitted". Also, the entry in the Workflow UID table 308 created in step 432 is updated to set the Valid field to 1 to indicate that the workflow is now valid. All these operations that constitute the log 5 update is performed within a database transaction boundary and when the transaction is committed, the log 5 entry is complete.

Note that the Workflow UID table is used by the Workflow Validation component of the fault-tolerant FSM engine, which in one embodiment is a process that operates using standard TCP/IP protocols, receives a TCP connection request from a scheduled workflow, receives information from the workflow including the workflow UID (that is one of the parameters passed to each workflow), and consults the Workflow UID table to determine if that workflow is valid by performing a lookup of that table based on the workflow UID passed to it. An entry is created in this table before the workflow is scheduled, in step 432, but with the Valid field set to neither 0 nor 1 but to −1 to indicate that validity is not yet determined. Other values may be used to indicate the statuses. Once the workflow is submitted in step 434, there is no guarantee that the workflow will not be scheduled and start execution (and therefore, request validation) before step 436 is completed, because of the unpredictability of process execution sequences in a distributed system. Creating the entry in the Workflow UID table in step 432, but setting the Valid field to −1, indicates that the workflow's validation is not determined yet. In case the workflow requests validation before theValid field is updated to 1 or 0 in step 436, the process within the FSM Engine which performs the validation will wait for the field to change, which it is guaranteed to do eventually, which will occur during log-replay if the fault-tolerant FSM engine crashes before step 436.

In step 438, the FSM transitions to the next state where it is expected to quiesce until it is restarted because of the next event. At this point, the "execute" operation of the in-memory FSM engine, invoked by step 424 of the fault-tolerant FSM engine, completes, and control returns to step 424, at which point, step 426, which has been already described earlier, is performed.

Note that many of the operations described above involving external systems can fail even if the FSM engine itself does not crash, and in each case, the failure is treated appropriately. For example, in step 434, the workflow submission can fail if there is a problem with the external workflow engine. In that case, the FSM engine cannot provide a generic recovery strategy. Instead, the FSM should be encoded to treat that condition as an external system failure. For example, the FSM definition might contain the logic to possibly transition to a different state upon workflow submission failure where it periodically "pings" the workflow system using timers, using a "read only" API provided by that system, until it detects that the workflow system is back up again, in which case it could transition back to the original state where it attempted to schedule the workflow. Similarly, if the FSM engine fails while a workflow validation is in progress, or is unavailable to perform validation when a workflow is scheduled, then the workflow will fail. This failure will be reported to the FSM engine via the event mechanism, and regardless of whether the event is received or not (it will not be if the FSM engine is not operational), how the eventual workflow status (validation failed, or workflow timed out) is to be handled has to be specified by the FSM modeler. No generic handling by the FSM engine is possible.

Figure 5:
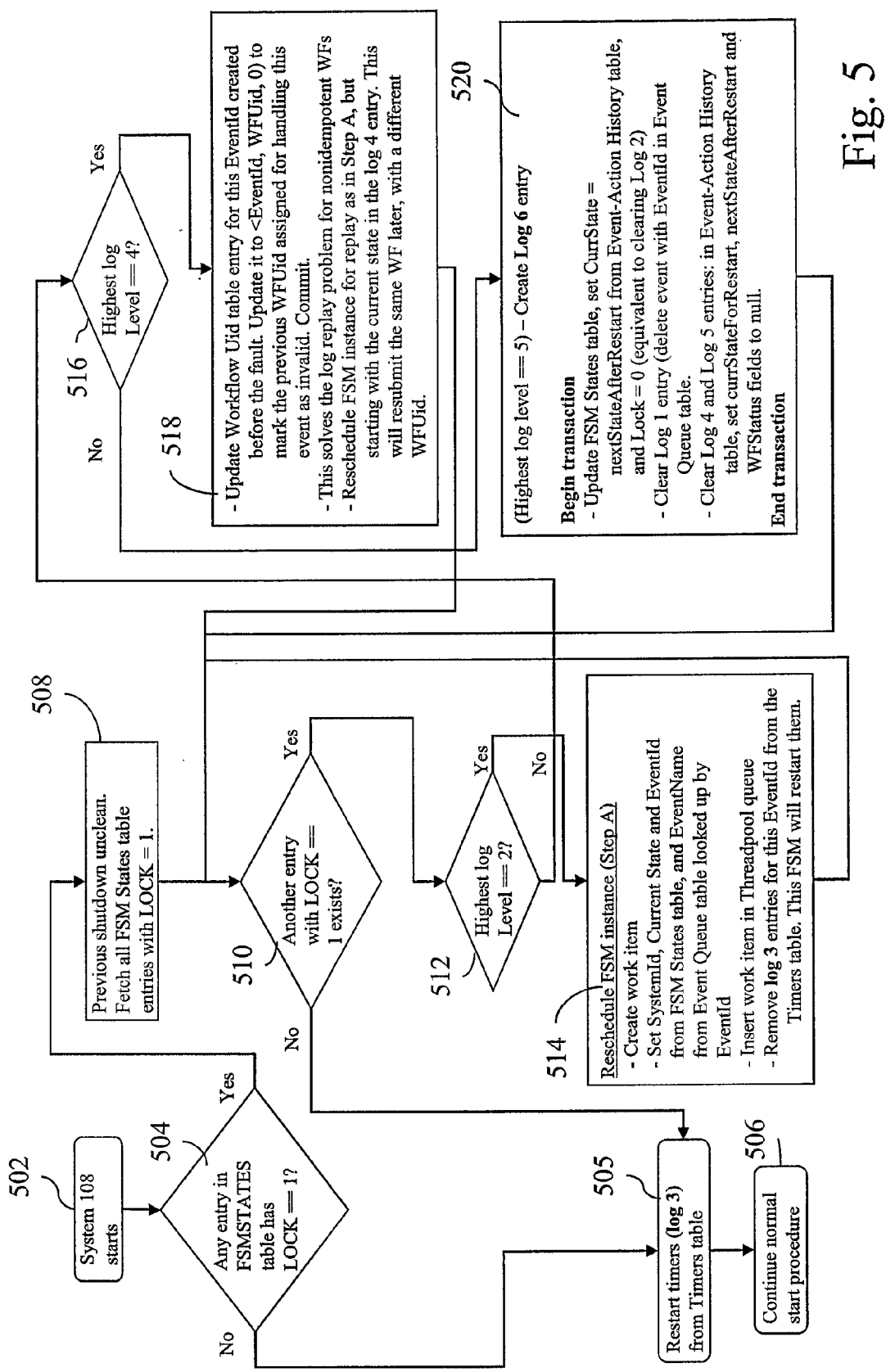
FIG. 5 is a flow diagram illustrating log replay logic in one embodiment of the present disclosure for recovery on system restart utilizing the components shown in FIG. 2.

FIG. 5 is a flow diagram illustrating the log replay logic for recovery from an abnormal shutdown (crash) on system restart, in one embodiment of the present disclosure,. The logic may be executed on system restart including the first time ever that the finite state machine engine (e.g., FIG. 2, 200) is started. Upon being (re)started, the FSM engine first determines if in its previous execution, it was shutdown normally or abnormally. In the latter case, there will be one or more FSM instances whose incremental execution did not complete normally (through log 6), and the purpose of the restart logic described in FIG. 5 is to facilitate the reexecution of those incomplete executions so that the events those FSM instances were processing before the crash are processed correctly. In one embodiment of the present disclosure, for each FSM instance, the highest level of log entry (2 through 6) that is found to be successfully recorded in persistent storage is used to determine which FSM instances did not execute successfully in the previous incarnation of the FSM engine, and from which point in their execution the replay should begin.

At 502, the FSM engine (the system) 200 is started. Whether it is a restart or the first ever start is not relevant for the replay logic. Before the rest of the logic can be executed, a minimum amount of overall system initialization steps are completed—e.g., database initialization so that the log entries can be accessed, and enough of the Thread pool initialization process so that FSM execution-related work items can be resubmitted during log replay without actually starting their execution. That will occur later when the rest of the system initialization completes in step 506. Note that during the log replay stage, the event queue polling thread and the Thread pool for handling queued FSM instance execution work items are not started in one embodiment of the present disclosure; they are only started after the recovery steps are completed, during 506. In one embodiment, execution of the flowchart in FIG. 5 can be performed by an "initialization thread" or a special "recovery thread" during system start.

At 504, it is determined whether any entry in the FSM states table has the Lock flag set to 1. If no entry has a lock flag set (i.e., all values are 0), then the previous shutdown of the system was clean, i.e., log level 6 was successfully updated for all FSM instances previously executed. Otherwise there was at least one incompletely executed FSM instance in the previous incarnation of the FSM engine, and the execution of all those instances has to be restarted or completed.

If no FSM entry has Lock=1 (the No branch of 504) or all such FSM instances have been restarted or completed (the No branch of 510), any timers started during past executions of the FSM engine are restarted. In 505, the Timers table (log 3) is examined and all timer entries where the CreationTime+Msecs value does not exceed the current time are restarted using the in-memory timer service provided by the default execution environment, where the new timer duration value Msecs is set to (old value of Msecs—(current time−CreationTime)), and the Msecs and CreationTime entries in the table are updated with the new values. For other Timers table entries where the value (CreationTime+Msecs) exceeds the current time, the timers would have expired had the FSM engine not shut down. For each of those entries, an event is inserted into the event queue 204 using the SystemId, SystemType and EventName values, and the corresponding Timers table entry is deleted. Once this step is completed, the rest of the normal startup procedure for the FSM engine continues in step 506—such as creation of the polling thread, initialization of the thread pool, and other actions.

The log replay steps are carried out as long as one or more entries exist in the FSM States table with Lock=1. All such entries are fetched using a query on the FSM States table in 508, and each entry is iterated through using the decision logic in 510 to determine when all entries with Lock=1 have been processed. As long as the decision step 510 evaluates to Yes, there is one more abnormally ended FSM instance which has to be repaired, and control proceeds to step 512.

The highest log level set during a previous run of an abnormally terminated FSM instance execution may be from 2 through 5 since in log 6, the Lock field is set to 0. Thus, recovery steps 510-520 are taken for each entry in the FSM states table that has its Lock field set to 1. As explained above, during FSM instance execution, different log entries are created in the tables described in FIG. 3, and each entry corresponds to a log level. For an FSM that exited properly after finishing all its tasks, the log level is 6 as represented by the Lock field value of 0 in the FSM States table. If, for a given FSM instance, only the Lock is set to 1 in the FSM States table, but there is no entry in the Event-Action History table for the corresponding <SystemId, EventId> pair, then there is no log 4 or log5 entry for that FSM instance handling that event and the highest log level is thus 2. However, if there is an entry in the Event-Action History table for that (EventId, SystemId) combination, then if the WFStatus field for that entry is set to "submitting", then the highest log level is 4, but if the WFStatus field has the value "submitted", then the highest log level is 5. This is the logic in one embodiment of the present disclosure for checking the highest log level for a given FSM instance whose execution did not terminate normally, as referenced in the flow diagram of FIG. 5.

In 512, a check is made to see if the highest log level for the given FSM instance (handling the event with ID EventId) is 2. If true, then it means that the FSM instance execution was never started (i.e., a thread in the Thread pool was never assigned to execute it), or that it did start execution, but did not get to the step to try to schedule a workflow. The assumption then is that the prior FSM instance execution has had no external side effects, since the only side effects are workflow executions. In that case, the execution of the FSM instance can be rescheduled and started from the beginning, for the value of current state used in the previous execution as recorded in the FSM States table. At 514, the FSM instance is rescheduled for replay. The event queue contains the entry representing the event with EventId that is associated with this FSM instance. The recovery thread creates a work item (object) associated with this event to reschedule the FSM instance, repeating many of the steps of 416 in FIG. 4A. The work item includes the data required to re-execute the FSM instance, namely the SystemId of the IT element, the SystemType used to instantiate the correct FSM type, the CurrState value representing the start state for the previous execution which did not complete, and the EventID—all fields of the FSM States table—and the EventName field fetched from the Event Queue table looked up by EventId. The recovery thread reinserts the work item into the thread pool queue. The work item will be processed once the thread pool is initialized in step 506. Another difference with regular FSM instance scheduling is that the log 3 entries, corresponding to timers scheduled by the FSM instance for the given EventId during the previous incomplete execution, are cleared (the in-memory timers are not running yet after the restart), since when the FSM instance will be reexecuted, it will restart any timers required for handling the event as per the FSM definition and new log 3 entries will be created. The processing then continues to 510 to repeat the check for the next entry found in the FSM States table with the Lock flag set to 1.

Otherwise at 512, if the highest log level is not set to 2, it is determined at 516 whether the highest log level recorded during the previous execution of this FSM instance is 4. If true, then processing continues to 518. Otherwise, the processing continues to 520. The highest log level being 4 implies that although the FSM instance logged the intent to schedule a workflow, the system crashed either before invoking the workflow-system's API call to submit the workflow, or after making the API call but before the (synchronous) call completed, or after the call completed but before the log 5 level entry (in the Event-Action History table) could be completed. Regardless of the above possibilities, the recovery action is to reschedule the workflow. Note that due to the workflow validation protocol, the workflow could not have run already even if it were submitted successfully, since it is only after the log 5 update (step 436 in FIG. 4B) is successfully committed to the database that the Valid field of the workflow UID assigned to the workflow is set to 1 and it is known that the log 5 update was not successful. Thus, at 518, the previous workflow that might have been scheduled is first made invalid by selecting the entry in the Workflow UID table that has a WFUid field value that is the same as the WFUid field value recorded in the Event-Action History table entry for this EventId (the log 4 entry for this FSM instance handling that event), and setting the Valid field of that entry to 0. The FSM instance is then scheduled for replay. The replay is repeated for the SystemId, EventId, and EventName values, but there is no need to start the replay from the previous CurrState value in the FSM States table. The replay should occur from the special FSM state in which the workflow scheduling occurs. To enable that, the sequence of actions described in 514 are repeated to create a work item and queue it to the thread pool, but with the difference that the FSM instance's start state is "primed" using the currStateForRestart field value in the Event-Action History table (log 4) entry and not the value of CurrState in the FSM States table. The processing continues to 510 to repeat the procedure for the next entry found with Lock field set to 1 in the FSM states table.

Processing continues at 520 if the highest log level for this FSM instance is 5. The highest log level being 5 implies that FSM engine crashed after the workflow system API to schedule the workflow returned control to the engine, that outcome was logged in the Event-Action History table (the log 5 entry), but before the FSM instance could return control to step 426 in FIG. 4B. In this case, it is known that the workflow scheduling request has been completed (the workflow execution itself could have, but the handling of that failure is encoded in the FSM definition). The next state to which the FSM instance would have transitioned to and quiesced (until the next event is received) under the normal flow of execution is also known—via the nextStateAfterRestart field in the Event-Action History table entry. In this case, the replay logic performs the equivalent of the log 6 entry as described in 426 in FIG. 4B, except that the CurrState field in the FSM States table is set to the nextStateAfterRestart field value in the Event-Action History table.

The log 6 entry is created during replay because for all practical purposes, the FSM completed execution before the system crashed, so only the final bookkeeping to mark the FSM instance execution as being complete is performed in 520. Note that besides updating the FSM States table, fields of the Event-Action History table that represent log 4 and 5 level entries are also cleared (the currStateAfterRestart, nextStateAfterRestart, and WFStatus fields are set to null) since they are not required any more for replay purposes. Also, the event entry in the Event Queue table with ID EventId is deleted since the event has now been handled. The processing continues to 510 to repeat the procedure for the next entry found with lock flag set to 1 in the FSM states table. At 510, if all entries have been processed, the logic continues at 505 to process the Timers table log entries.

Note that in the descriptions of both the event processing steps (FIGS. 4A and 4B) as well as the replay steps (FIG. 5), certain operations are bounded by "begin transaction" and "end transaction" directives. As explained earlier, this implies transactional (atomic) update semantics provided by relational database systems. (Similar atomic operations may be utilized for file updates). For a given FSM instance execution or replay, if the system crashes while the some database update statements following the "begin transaction" directive have been executed, but before the "end transaction" directive has been run, then all database updates following the "begin transaction" directive will be rolled back. Upon system restart, either the FSM instance execution or its replay itself (which tries to restore or complete the execution) will appear to be incomplete upon examination of the database tables, and the replay logic of FIG. 5 will rerun and restore execution status correctly.

Another embodiment of the replay logic of FIG. 5 can provide a different feasible embodiment of fault tolerance. In step 518, replay of a given FSM instance can be started from the original current state recorded in the FSM States table, and not the currStateForRestart value in the Event-Action History table. If none of the state transitions until the special state for workflow scheduling have permanent side effects which is an assumption of the "modeling pattern", then one difference of making this change in the replay logic is that the decision process that led to the execution of the workflow itself will be re-executed and this workflow may not even be run any more. Given that the replay may occur a long time after the crash, re-executing the entire decision process seems to be a feasible and potentially useful alternative embodiment. Given this other embodiment, it is then no longer necessary to isolate the workflow scheduling step to a separate state in the FSM as a "modeling pattern", which provides additional flexibility during FSM modeling.

The methodology of the present disclosure in one embodiment relies on logging information to persistent storage. The embodiment described in this disclosure uses relational database tables, and also uses transactional semantics provided by relational database query and update operations that span multiple tables—specifically those bounded by "Begin Transaction" and "End Transaction" directives. However, another embodiment can use flat files, with records representing information (tuples) stored in database tables. In the file-based embodiment, techniques using transactional logging can be used to implement the transactional semantics required in the various logging steps outlined in this disclosure. Relational database systems are implemented on top of flat files that store the tuples of database tables, with additional files serving as transaction logs to implement commit and rollback operations.

If a database system is being used to create persistent log entries as has been described in one embodiment, then a failure of the database system itself may be also handled appropriately. In this case, any log update for levels 2 through 6 may fail for FSM instances that are currently being executed. For any FSM instance where a log update operation, performed by the fault-tolerant FSM engine, fails due to a database connection (or other) type of failure indicating a database outage, the FSM engine should stop executing that FSM instance immediately. At a global level, the FSM engine should go into an internal Database-Recovery state where it periodically attempts to connect to the database system. Once this is successful, it can resume execution of all the FSM instances that were in progress. It can do this by performing the log replay steps described in FIG. 5. For instance, a failure of the database system that affects log updates during the execution or replay of FSM instances can be treated exactly as if the fault-tolerant FSM engine itself crashed at that point, and the recovery process of FIG. 5 will recover from the failure once the access to the database system is enabled again.

Figure 6:
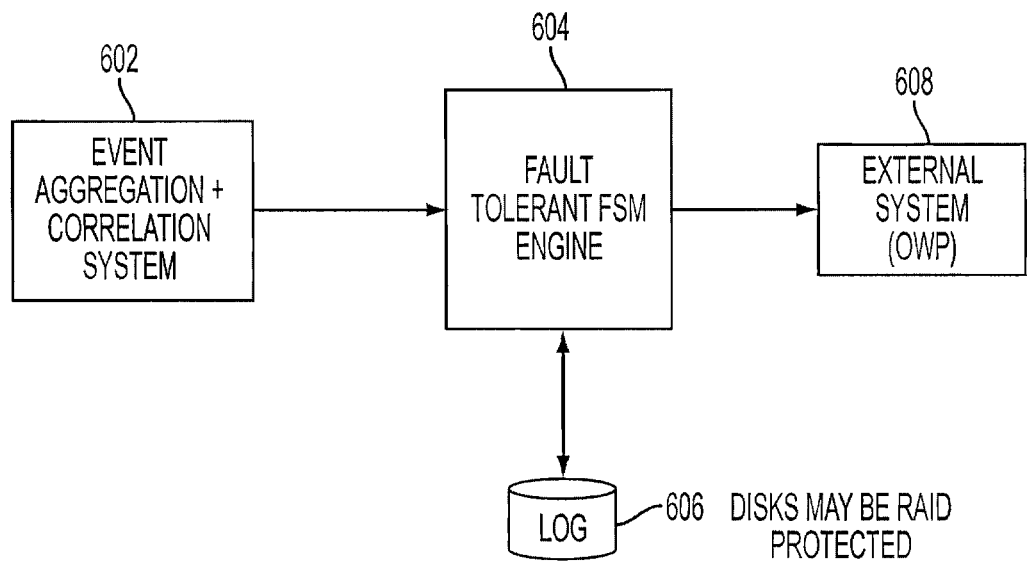
FIG. 6 is a block diagram that illustrates one embodiment of the present disclosure that provides fault tolerance with a single copy of the FSM engine.

In one embodiment of the present disclosure, the fault-tolerance in the FSM engine is implemented without replication. That is, an FSM engine in the present disclosure may be fault-tolerant without requiring a backup or duplicate copy of it to take over in the case where the original FSM engine fails. The fault-tolerant FSM engine of the present disclosure is tolerant of all software faults (fixable with reboot) other than defects (bugs) in its own implementation, and hardware faults which can be repaired and the machine rebooted. FIG. 6 shows a block diagram of a single copy fault-tolerant FSM engine. The Event Aggregation and Correlation system 602 forwards events related to problems and changes to the Cloud IT infrastructure (or another system) as well as the status of automated actions taken to FSM engine 604 for processing and taking possible remediation actions in response. During such processing, the FSM engine 604 logs information related to its execution steps in persistent storage 606. In one aspect, the persistent storage backing up the log is local to the machine that is running the FSM engine 602, in which case the methodology of the present disclosure need not be dependent on the health or working condition of any existing network or network connections. After a failure of the system that is running the FSM engine 604 and its subsequent reboot, the FSM engine 604 is able to continue it's processing by accessing the logs in the persistent storage 606. The underlying technology used to provide persistent storage for logs, whether that is implemented using files or a relational database, may be one or more hard disk drives, solid state drives, or flash memory. Data stored in disk drives can be protected against a single drive failure using RAID 1, 5, 6, and other schemes. In another embodiment, the disk drives used for the persistent storage required for logging might not be locally attached (direct attached storage, or DAS), but instead might be accessed using a storage area network (SAN).

The methodology of the present disclosure in one embodiment is also enabled to interact with external systems, specifically a workflow system (112 in FIG. 1) used to run workflows that perform corrective actions, but which offers no specific guarantees about when scheduled workflows will execute, whether workflow execution is fault-tolerant, and whether scheduled workflows can be cancelled. In distributed systems literature, such systems are referred to as Other World Processes (OWPs). The methodology of this disclosure describes how to perform recovery actions after a failure in order to implement fault tolerance of the FSM engine, while taking into account the "black box" nature of the OWP it interacts with, for example, to prevent the duplicate execution of workflows due to log replay.

Due to the nature of the persistent FSM execution framework of the present disclosure in one embodiment, the methodology also addresses the scalability requirement that thousands of FSM instances (for example, each representing a server in a cloud) have to be executed in parallel, since no FSM is required to reside in memory continuously. For example, in one embodiment of the present disclosure, an FSM instance is instantiated and run using the in-memory FSM engine only when an event is received from that IT element (see 422 in FIG. 4B), and the instance is destroyed (step 426 in FIG. 4B) and the memory allocated for the object can be freed once the execution of the FSM instance completes successfully.

Figure 7:
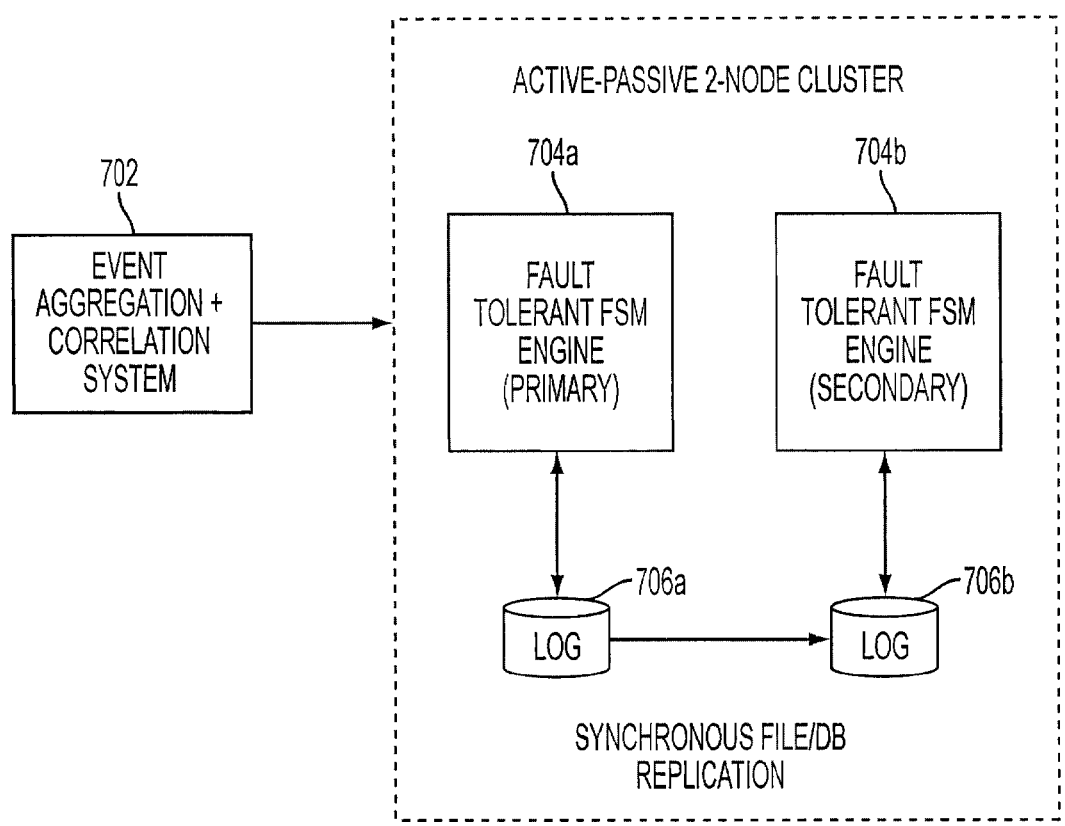
FIG. 7 is a block diagram illustrating one embodiment of the present disclosure that provides fault tolerance with multiple copies of the FSM engine in an active-passive configuration.

In another embodiment of the methodology in the present disclosure, active-passive replication may be used to improve the availability characteristics of the AIMS system built using this approach. Off-the-shelf clustering systems such as IBM's Tivoli System Automation (TSA) and Microsoft™ Clustering Services (MSCS) enable such configurations. FIG. 7 is a block diagram illustrating active-passive replication in one embodiment of the present disclosure where there are two copies of a server, each of which has the software necessary to run the FSM engine 200 of FIG. 2, and each server is connected to persistent storage containing the log data, which in turn might be DAS or SAN-attached. Instance "a" is the primary and is active and executes under normal conditions unless either the server on which the FSM engine runs or the storage providing persistent logging data fails. Log entries created in 706a are synchronously replicated to the "passive" log 706b, using techniques such as block level disk replication, file level replication, or database level replication (if a relational database is being used for logging). Upon failure of 704a or 706a, control can be automatically switched over to the "b" system using cluster control automation provided by systems such as IBM TSA or Microsoft's MSCS. Once the FSM engine starts in 704b, it can perform the replay operations using the log entries in 706b (which in turn contains, at a byte level all the log entries that were committed by 704a to log 706a) and become the replacement FSM engine for 704a. Once the "a" system becomes operational, control can be switched back to it after ensuring that log 706a is replicated (in the reverse direction, in real time) from log 706b, using disk, file, or database replication techniques.

Figure 8:
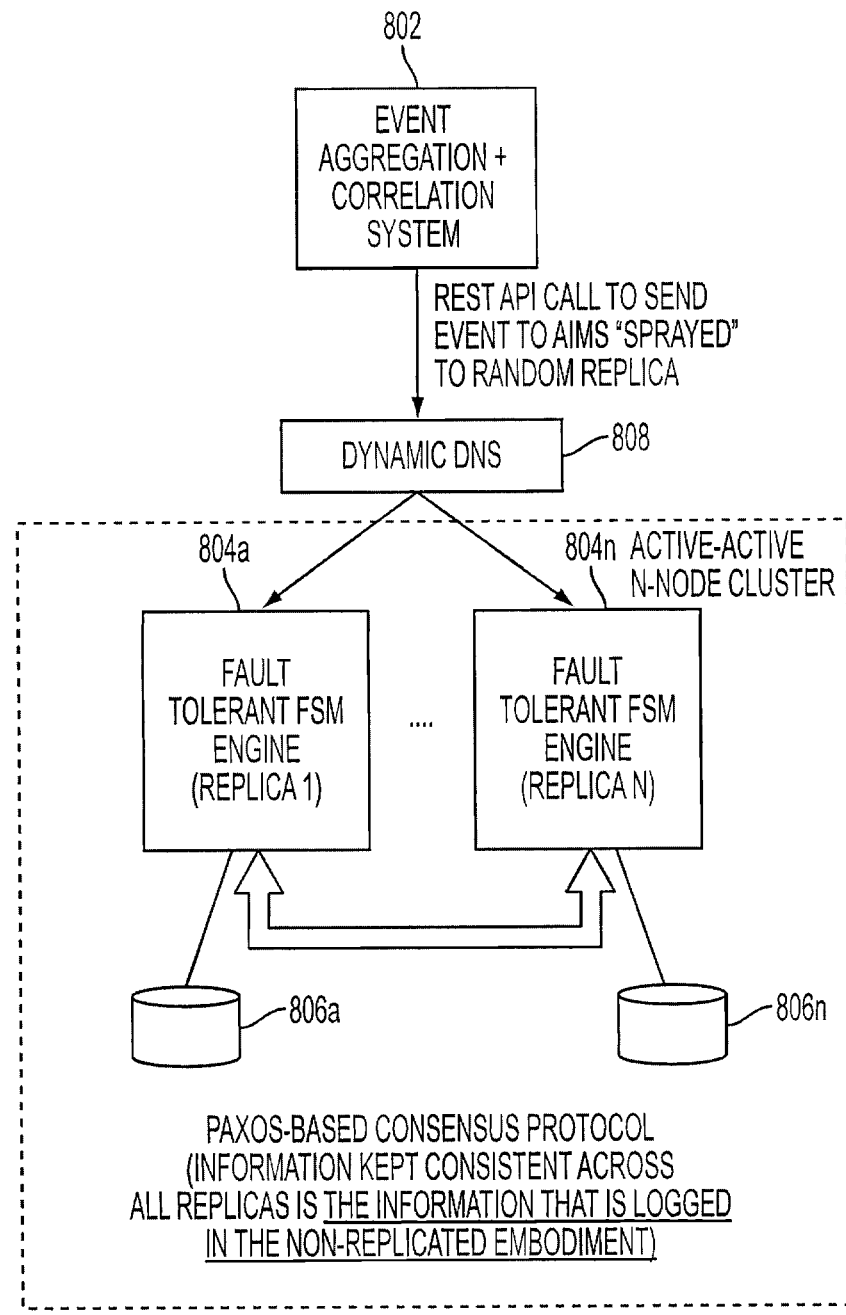
FIG. 8 is a block diagram illustrating one embodiment of the present disclosure that provides fault tolerance with multiple copies of the FSM engine in an active-active configuration.

In another embodiment of the methodology in the present disclosure, active-active replication may be used. FIG. 8 is a block diagram illustrating an active-active replication in one embodiment of the present disclosure. Such a system can be developed using techniques such as the Paxos algorithm for reliably distributing (in-memory) state information across multiple copies of a software program executing in multiple computers and communicating with each other over a network using a protocol such as TCP/IP as well as higher level protocols. For example, the Zookeeper system provides a framework for building an N-node active-active distributed system.

In one embodiment, there may be N replica copies (804a, . . . 804n) of the FSM engine, each containing FSM definitions (see 110 in FIG. 1) that describe how to handle events received on different types of IT elements (e.g., in the Cloud IT infrastructure), and each running on one of nodes (computers) 1 . . . n in the cluster. Each event transmitted by the Event Aggregation and Correlation system 802 is sent to some (random) instance of the FSM engine 804, as determined by how the common hostname of the cluster (which appears as a single virtual computer to the outside world) is resolved to the IP address of one of the nodes in the cluster by the Dynamic Domain Name Server (DDNS) 808. The clustering protocol (e.g., as implemented in Zookeeper) allows one node to be dynamically elected as the master—the cluster leader.

In one embodiment, the leader can assign to each node 1 . . . n the responsibility of running the FSM instances for some subset of the IT elements, and distribute that assignment to all cluster nodes using Paxos. When an event is received by a random node selected by the DDNS, that node in turn can forward the event to the node that is assigned to handle that event using its copy of the global state representing node assignments. When an FSM instance runs on node 'i', it does not create log entries in persistent storage as described in the single and active-passive embodiments above. Instead, it distributes the log data to all other nodes using Paxos. Therefore, in this embodiment there is no persistent logging, but a distributed, in-memory log. If any single node fails, the cluster leader assigns another node in the cluster to take over the event handling responsibilities of the failed node—namely which IT elements it is responsible for.

Also, if the node that failed was the cluster leader, then a new leader is first elected. Since the node that is assigned the responsibility of the failed node has access to all the log entries in its memory (distributed state), it can continue the execution of the failed node using those log entries, but after first performing the replay logic if any of the FSM instances running in the failed node did not complete execution cleanly.

The present disclosure in one embodiment provides, in the context of a distributed, fault-tolerant FSM engine, the guarantee that the state information being distributed via Paxos for distributed execution (other than task assignments and leader election), if limited to just the log entries described in the single-copy embodiment, is sufficient for implementing fault-tolerance, and may be the optimal amount of information that needs to be shared across all cluster members in an active-active configuration.

Note that in the active-active system implemented using off-the-shelf clustering software such as Zookeeper, local storage and transaction logs (using files) are also utilized under the covers. However, the FSM engine itself does not log to persistent storage, it simply distributes that information to all nodes in the cluster. It is the logging scheme (for efficient replay for fault tolerance) disclosed in this disclosure in one embodiment that defines the in-memory state that is shared in the active-active embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for executing finite state machines in a scalable and fault tolerant manner, comprising:
   one or more processors;
   persistent storage for storing data associated with handling of an event associated with an information technology element;
   a finite state machine engine operable to receive the event and execute a finite state machine instance representing the information technology element, and operable to log in the persistent storage, a plurality of internal actions associated with processing of the event, wherein if the finite state machine engine is stopped while in execution, the finite state machine engine continues to process the event based on the persistent data logged in persistent storage indexed by the finite state machine instance to complete the handling of the event, after the finite state machine engine is restarted, wherein the finite state machine engine schedules a thread to handle the event and logs data associated with the scheduled thread handling the event, the thread invoking an instance of the finite state machine representing the information technology element, wherein the instance of finite state machine executes state transitions associated with the information technology element until blocking and returns control to the finite state machine engine, at which time current state information of the finite state machine instance is logged in the persistent storage and the finite state machine instance is deleted.

2. The system of claim 1, wherein the finite state machine engine logs data at different log levels in persistent storage during the processing of the event, and wherein the finite state machine engine determines, after it is restarted, if the finite state machine instance terminated abnormally, and if so, locates the correct point in the instance from which to continue execution for the continuing the processing of the event, by using the data logged at different log levels.

3. The system of claim 1, wherein the finite state machine engine receives the event from an external module and queues the event into an event queue, the event queue being stored in the persistent storage.

4. The system of claim 1, wherein the instance of the finite state machine is operable to queue a workflow with an external workflow module during its execution.

5. The system of claim 4, wherein the instance of the finite state machine assigns a unique identifier to the workflow, logs data indicating the workflow is to be submitted, and after submitting the workflow, logs data indicating the workflow was submitted and also logs data identifying the workflow unique identifier as being valid.

6. The system of claim 5, wherein the workflow performs a validation step with the finite state machine engine presenting the workflow unique identifier, and the finite state machine, if resubmitting the workflow during log replay after an abnormal termination, invalidates the previously assigned unique identifier in the workflow identifier log, and assigns a new unique identifier to the resubmitted workflow, to prevent non-idempotent workflows from being reexecuted during log replay.

7. A system for executing finite state machines in a scalable and fault tolerant manner, comprising:
   one or more processors;
   persistent storage for storing data associated with handling of an event associated with an information technology element;
   a finite state machine engine operable to receive the event and execute a finite state machine instance representing the information technology element, and operable to log in the persistent storage, a plurality of internal actions associated with processing of the event, wherein if the finite state machine engine is stopped while in execution, the finite state machine engine continues to process the event based on the persistent data logged in persistent storage indexed by the finite state machine instance to complete the handling of the event, after the finite state machine engine is restarted, wherein the persistent data store includes an event queue operable to store a plurality of events respectively associated with an information technology element, a finite state machine states table operable to store information associated with a plurality of states respectively associated with a plurality of finite state machines each associated with a type of information technology element, a workflow unique identifier table operable to store a plurality of scheduled workflows, a timer table operable to store timers scheduled by running finite state machine instances, and an event-action history table operable to store information associated with a plurality of events and associated corrective actions taken during executions of finite state machine instances.

8. The system of claim 7, wherein the finite state machine engine logs data at
   different log levels in the persistent storage during the processing of the event, and wherein the finite state machine engine determines the correct point in the processing of the event from which to continue execution after the finite state machine engine is restarted by using the data logged at different log levels, wherein the different log levels are determined based on whether one or more different entries have been updated in one or more of: a finite state machine states table operable to store information associated with a plurality of states respectively associated with a plurality of finite state machines each associated with a type of information technology element, a workflow unique identifier table operable to store a plurality of scheduled workflows, a timer table operable to store timers scheduled by running finite state machine instances, and an event-action history table operable to store information associated with a plurality of events and associated corrective actions and status of whether a workflow is being submitted or has been submitted.

9. The system of claim 8, wherein multiple finite state machine engines are configured in an active-active configuration using distributed state sharing technology, and a shared state that includes information that is logged by each finite state machine engine.

10. A non-transitory computer readable storage medium storing a program of instructions executable by a machine to perform a method for scalable, fault-tolerant finite state machine, comprising:

receiving an event associated with an information technology element;

identifying an entry associated with the information technology element in a finite state machine states table stored in persistent storage;

updating the entry as locked in the finite state machine states table and storing the updated finite state machine states table in the persistent storage;

creating a finite state machine instance to process the event and initializing it with information from the finite state machine states table;

invoking an execute operation of the finite state machine instance, wherein the finite state machine instance executes state transitions associated with the information technology element, starting from the point where it finished execution when it was last invoked;

logging data in the persistent storage indicating that a workflow is to be scheduled before submitting the workflow;

logging data in the persistent storage indicating that the workflow is submitted after scheduling the workflow; and after the finite state machine instance finishes, updating the entry as unlocked, and also storing current state information to be used in the next execution, in the finite state machine states table.

11. The computer storage medium of claim 10, wherein after restart of the finite state machine, the finite state machine determines a point in processing of the event based on data stored in the persistent storage and continues to process the event from the determined point.

12. The computer storage medium of claim 11, wherein after the restart of the finite state machine, the finite state machine selects one or more entries in the finite machine states table having locked status, and continues to process one or more events specified in the selected one or more entries from the determined point.

13. The computer storage medium of claim 12, wherein the determined point is creating a finite state machine instance to process the event, if no entries are logged associated with event action history.

14. The computer storage medium of claim 12, wherein the determined point is scheduling the workflow if data in the persistent storage indicates that a workflow associated with the event is to be submitted.

15. The computer storage medium of claim 12, wherein the determined point is updating the entry as unlocked and a current state, in the finite state machine states table, if the data in the persistent storage indicates that the workflow was submitted.

* * * * *